(12) United States Patent
Kuwano

(10) Patent No.: US 11,402,619 B2
(45) Date of Patent: Aug. 2, 2022

(54) IMMERSION MICROSCOPE OBJECTIVE

(71) Applicant: OLYMPUS CORPORATION, Hachioji (JP)

(72) Inventor: Makoto Kuwano, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 572 days.

(21) Appl. No.: 16/372,131

(22) Filed: Apr. 1, 2019

(65) Prior Publication Data

US 2019/0324250 A1 Oct. 24, 2019

(30) Foreign Application Priority Data

Apr. 19, 2018 (JP) .............................. JP2018-080951

(51) Int. Cl.
*G02B 21/02* (2006.01)
*G02B 21/33* (2006.01)

(52) U.S. Cl.
CPC ............. *G02B 21/02* (2013.01); *G02B 21/33* (2013.01)

(58) Field of Classification Search
CPC ...... G02B 21/02; G02B 21/33; G02B 21/025; G02B 21/04; G02B 21/0024; G02B 13/003; G02B 15/142
USPC ................. 359/368, 717, 691, 736, 656–661
See application file for complete search history.

(56) References Cited

U.S. PATENT DOCUMENTS

| | | |
|---|---|---|
| 5,502,596 A | 3/1996 | Suzuki |
| 5,517,360 A | 5/1996 | Suzuki |
| 5,530,590 A | 6/1996 | Saito |
| 5,805,346 A * | 9/1998 | Tomimatsu ............ G02B 21/02 359/656 |
| 5,898,524 A | 4/1999 | Ryzhikov |
| 7,382,542 B2 | 6/2008 | Wartmann |

(Continued)

FOREIGN PATENT DOCUMENTS

| | | |
|---|---|---|
| DE | 102008006826 A1 | 8/2009 |
| JP | 05142477 A | 6/1993 |

(Continued)

OTHER PUBLICATIONS

Extended European Search Report (EESR) dated Sep. 23, 2019 issued European Application No. 19165698.2.

(Continued)

*Primary Examiner* — Stephone B Allen
*Assistant Examiner* — Rahman Abdur
(74) *Attorney, Agent, or Firm* — Holtz, Holtz & Volek PC

(57) ABSTRACT

An immersion microscope objective includes: a first lens group that includes a meniscus lens component that is closest to an image among the components of the first lens group, the meniscus lens component having a convex surface facing an object; and a second lens group that includes at least one lens component. The first lens group includes a first cemented lens that is closest to the object. The first cemented lens consists of a planoconvex lens that includes a plane surface facing the object and a meniscus lens that has a negative refractive power. The objective satisfies the following conditional expressions:

$$2.4 \le f1/fob \quad (1)$$

$$1.8 \le n12 \le 1.85 \quad (2)$$

where f1 indicates a focal length that the first cemented lens has for an e line, fob indicates a focal length that the objective has for the e line, and n12 indicates a refractive index that the meniscus lens has for the e line.

37 Claims, 11 Drawing Sheets

(56) References Cited

U.S. PATENT DOCUMENTS

| | | |
|---|---|---|
| 8,724,227 B2 | 5/2014 | Wartmann |
| 9,645,380 B2 | 5/2017 | Wartmann |
| 2002/0089760 A1 | 7/2002 | Yamaguchi |
| 2003/0053218 A1 | 3/2003 | Fujimoto et al. |
| 2006/0203354 A1 | 9/2006 | Fujimoto et al. |
| 2008/0149867 A1 | 6/2008 | Konishi et al. |
| 2009/0032732 A1 | 2/2009 | Konishi et al. |
| 2010/0177404 A1 | 7/2010 | Fujimoto |
| 2010/0182702 A1* | 7/2010 | Watanabe .............. G02B 21/33 359/656 |
| 2016/0116724 A1 | 4/2016 | Abe |
| 2017/0010454 A1 | 1/2017 | Abe |
| 2017/0322404 A1 | 11/2017 | Abe |
| 2018/0307021 A1 | 10/2018 | Schulz et al. |

FOREIGN PATENT DOCUMENTS

| | | | |
|---|---|---|---|
| JP | H06160720 A | 6/1994 | |
| JP | H06160721 A | 6/1994 | |
| JP | H06281864 A | 10/1994 | |
| JP | 07035983 A | 2/1995 | |
| JP | H11352406 A | 12/1999 | |
| JP | 2002148519 A | 5/2002 | |
| JP | 2002350734 A | 12/2002 | |
| JP | 2003021786 A | 1/2003 | |
| JP | 2004061589 A | 2/2004 | |
| JP | 2005189732 A | 7/2005 | |
| JP | 2007034020 A | 2/2007 | |
| JP | 2007121338 A | 5/2007 | |
| JP | 2008170969 A | 7/2008 | |
| JP | 2009075281 A | 4/2009 | |
| JP | 2010160465 A | 7/2010 | |
| JP | 2010186162 A | 8/2010 | |
| JP | 2016085335 A | 5/2016 | |
| JP | 2017016066 A | 1/2017 | |
| JP | 2018185510 A | 11/2018 | |

OTHER PUBLICATIONS

Japanese Office Action (and English language translation thereof) dated Mar. 15, 2022, issued in counterpart Japanese Application No. 2018-080951.

* cited by examiner

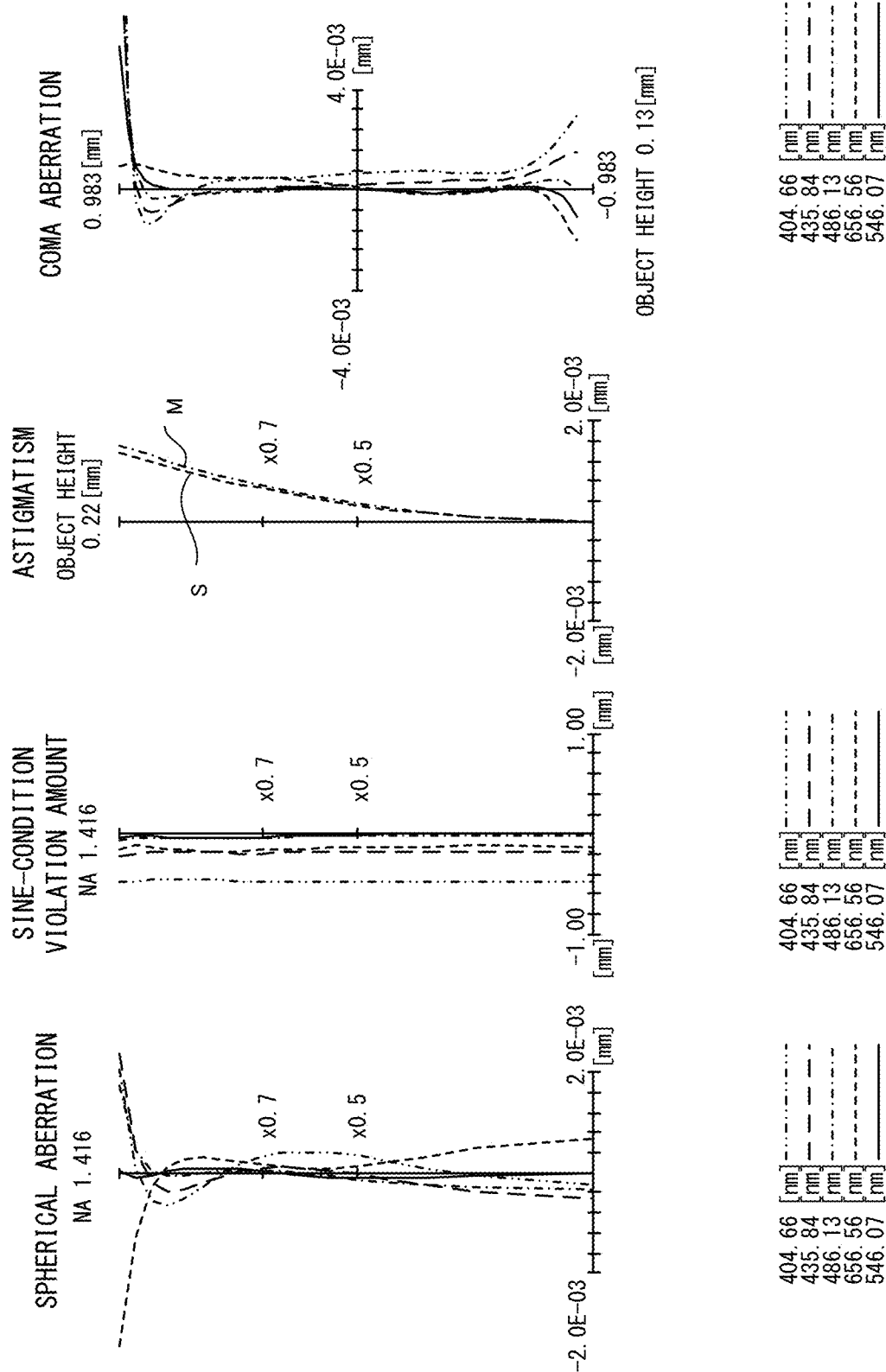

IMMERSION MICROSCOPE OBJECTIVE

CROSS REFERENCE TO RELATED APPLICATIONS

This application is based upon and claims the benefit of priority from prior Japanese Patent Application No. 2018-080951, filed Apr. 19, 2018, the entire contents of which are incorporated herein by this reference.

BACKGROUND OF THE INVENTION

Field of the Invention

The disclosure herein relates to an immersion microscope objective.

Description of the Related Art

In the field of biological microscopes in recent years, microscope apparatuses have been increasingly expected to allow observation and image capturing to be performed with both a wide field of view and a high resolution. There has been a demand for microscope objectives that have a high numerical aperture (hereinafter referred to as NA) and that achieve a high aberration performance over a wide field of view in order to achieve such a microscope apparatus. Biological microscopes may use excitation light with a wide bandwidth ranging from a short wavelength of about 400 nm to a near-infrared wavelength. Accordingly, the microscope objective can desirably accommodate a fluorescence observation based on excitation light having any wavelength that falls within a wide bandwidth.

Conventional immersion microscope objectives that have a high NA are described in, for example, Japanese Laid-open Patent Publication Nos. 2003-21786 and 7-35983.

SUMMARY OF THE INVENTION

A microscope objective in accordance with an embodiment of the present invention is an immersion microscope objective that includes: a first lens group that includes a meniscus lens component that is the closest to an image among the components of the first lens group, the meniscus lens component having a convex surface facing an object; and a second lens group that is closer to the image than the first lens group is and includes at least one lens component. The first lens group includes a first cemented lens that is the closest to the object among the components of the first lens group. The first cemented lens includes a planoconvex lens that includes a plane surface facing the object and a meniscus lens that has a negative refractive power and includes a concave surface facing the object, wherein the object, the planoconvex lens, and the meniscus lens are arranged in this order. The immersion microscope objective satisfies the following conditional expressions:

$$2.4 \leq f1/fob \quad (1)$$

$$1.8 \leq n12 \leq 1.85 \quad (2)$$

In these conditional expressions, f1 indicates a focal length that the first cemented lens has for an e line; fob, a focal length that the immersion microscope objective has for the e line; n12, a refractive index that the meniscus lens has for the e line.

BRIEF DESCRIPTION OF THE DRAWINGS

The present invention will be more apparent from the following detailed description when the accompanying drawings are referenced.

FIGS. 11A-11D are each an aberration diagram for an objective 5 depicted in FIG. 10.

DESCRIPTION OF THE EMBODIMENTS

Figure 1:
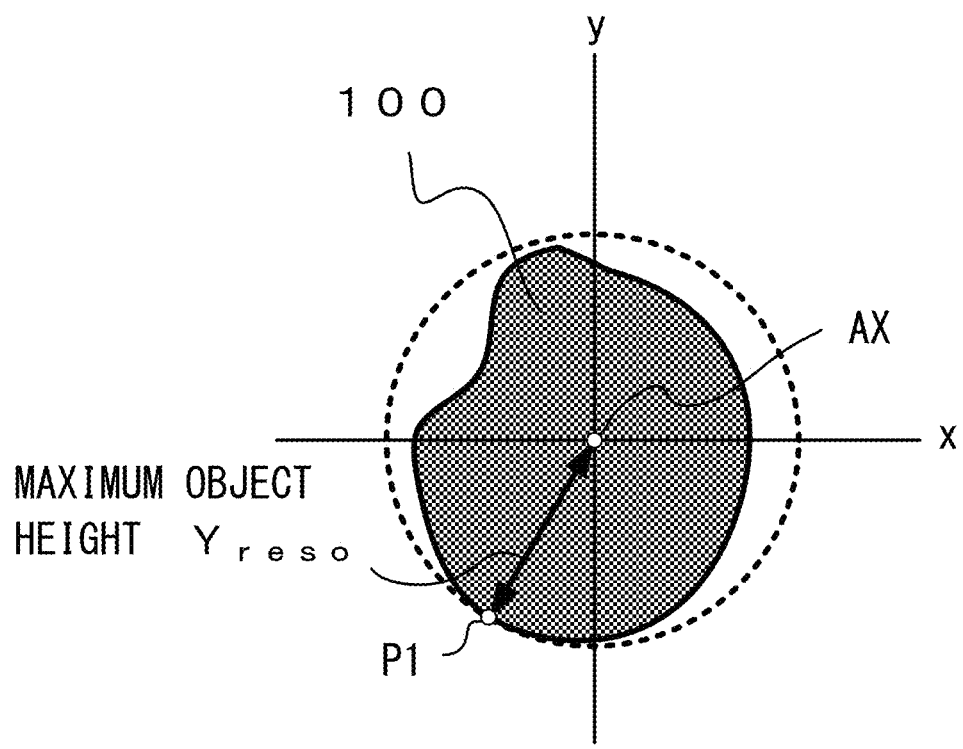
FIG. 1 is an explanatory diagram for a maximum object height $Y_{reso}$.

The microscope objectives described in Japanese Laid-open Patent Publication Nos. 2003-21786 and 7-35983 are insufficient to correct axial chromatic aberrations and off-axis aberrations (e.g., field curvatures and coma aberrations). Hence, these objectives cannot achieve a high performance for a wide wavelength region or a wide field of view.

The following describes an objective in accordance with an embodiment of the present application. The objective in accordance with the embodiment (hereinafter simply referred to as an objective) is an infinity-corrected microscope objective used in combination with a tube lens. The objective is what is called an immersion microscope objective and is used to observe a sample with an immersion liquid interposed between the sample and the objective.

The objective includes: a first lens group that includes a meniscus lens component that is the closest to an image among the components of the first lens group, the meniscus lens component having a convex surface facing an object; and a second lens group that is closer to the image than the first lens group is and includes at least one lens component. More particularly, the meniscus lens component that is the closest to the image among the components of the first lens group has a lens outer diameter, wherein the lens outer diameter divided by a thickness that the meniscus lens component has on an optical axis is 4 or lower. When the meniscus lens component is a cemented lens, the outer diameter of the meniscus lens component is the outer diameter of a lens that is the closest to the image among the lenses that constitute the meniscus lens component. When a plurality of meniscus lens components each have a lens diameter such that the diameter divided by a thickness that the meniscus lens component has on the optical axis is 4 or lower, the meniscus lens component that is the closest to the image among the components of the first lens group is the meniscus lens component that is the closest to the image among the meniscus lens components. A border between the first and second lens groups may be identified in accordance with this feature.

A pencil of light herein refers to a pencil of light rays emitted from one point of an object (object point). Whether a single lens or a cemented lens, a lens component refers to one lens block that includes lens surfaces through which a light ray from an object point passes, wherein only a surface on an object side and a surface on an image side among these lens surfaces, i.e., only two of these lens surfaces, are in contact with air (or immersion liquid).

The first lens group turns a pencil of diverging light rays from an object point into a pencil of converging light rays within the first lens group. The first lens group decreases the height of a marginal light ray of the pencil of converging light rays within the meniscus lens component that is the closest to an image among the components of the first lens group, and then emits the pencil of converging light rays from the concave surface of the meniscus lens component toward the second lens group. In addition, the second lens group turns the pencil of light rays from the first lens group into a pencil of parallel light rays. This allows the Petzval sum to be corrected effectively, with the result that field curvatures can be corrected in a preferable manner over the entirety of a wide field of view.

The first lens group includes a cemented lens that is the closest to the object among the lenses of the first lens group. This cemented lens will hereinafter be referred to as a first cemented lens. The first cemented lens, which is a cemented doublet lens, consists of a planoconvex lens that has a plane surface facing the object and a meniscus lens that includes a concave surface facing the object and has a negative refractive power, wherein the object, the planoconvex lens, and the meniscus lens are arranged in this order.

Providing the first cemented lens within a region located in the vicinity of the object that provides a low marginal light ray allows the Petzval sum to be corrected effectively by using the meniscus lens that has a negative refractive power while preventing generation of spherical aberrations. If an immersion objective includes, as with a dry objective, a lens having a concave surface that is the closest to an object among the lenses of the immersion objective, bubbles are likely to be trapped between an immersion liquid and the objective. By contrast, the first cemented lens of the objective in accordance with the present embodiment has a plane surface facing the object, thereby making bubbles unlikely to be trapped between the immersion liquid and the objective.

The refractive index of the planoconvex lens included in the first cemented lens is desirably lower than that of the meniscus lens included in the first cemented lens. This is because the planoconvex lens having a refractive index lower than that of the meniscus lens causes a cemented surface of the first cemented lens to have a negative refractive power, with the result that the Petzval sum can be corrected effectively.

In addition, the objective satisfies the following conditional expressions:

$$2.4 \leq f1/fob \quad (1)$$

$$1.8 \leq n12 \leq 1.85 \quad (2)$$

In these conditional expressions, f1 indicates a focal length that the first cemented lens has for an e line; fob, a focal length that the objective has for the e line; n12, a refractive index that the meniscus lens included in the first cemented lens has for the e line.

Conditional expression (1) defines power of the first cemented lens. Satisfying conditional expression (1) allows the objective to correct the Petzval sum in a preferable manner. This also allows the objective to correct axial chromatic aberrations effectively.

When f1/fob is lower than a lower limit of conditional expression (1), the power of the first cemented lens is excessively high. Hence, the light ray height is decreased at the lens components of the first cemented lens and following lens components, with the result that the lens surface (concave surface) on the image side of the meniscus lens component that is the closest to the image among the components of the first lens group has a low negative refractive power. This makes it difficult to correct the Petzval sum. In general, as an axial marginal light ray becomes higher, axial chromatic aberrations are generated more easily. When f1/fob is lower than the lower limit of conditional expression (1), a low axial marginal light ray is incident on a lens that is closer to the image than the first cemented lens is, thereby making it difficult to correct axial chromatic aberrations generated by the first cemented lens.

Conditional expression (2) defines the refractive index of the meniscus lens included in the first cemented lens. An optical material that has a high refractive index typically features high absorption and strong autofluorescence for a short wavelength. Accordingly, a material having a refractive index that is not excessively high is preferably used to achieve a high SN ratio in a fluorescence observation using excitation light having a short wavelength. Meanwhile, an optical material that has a high refractive index is typically highly dispersive. Hence, it is difficult to correct chromatic aberrations for a wide wavelength region by using an optical material having a high refractive index. Satisfying conditional expression (2) allows the objective to correct spherical aberrations and the Petzval sum efficiently in addition to allowing a fluorescence observation using excitation light having a short wavelength to be performed with a high resolution.

When n12 is lower than a lower limit of conditional expression (2), the curvature of a cemented surface needs to be increased to achieve a sufficient negative refractive power to correct the Petzval sum, thereby making it difficult to correct spherical aberrations together with the Petzval sum in a preferable manner. When n12 is higher than an upper limit of conditional expression (2), it is difficult to correct chromatic aberrations for a wide wavelength region, and it is also difficult to obtain a fluorescence image having a high SN ratio due to strong autofluorescence. As a result, it is difficult to perform a fluorescence observation or structure analysis with a high resolution.

An objective having a configuration such as that described above can correct chromatic aberrations and off-axis aberrations in a preferable manner.

The objective may satisfy conditional expression (1-1) or (1-2) instead of conditional expression (1). Alternatively, the objective may satisfy conditional expression (1-3) instead of conditional expression (1) or conditional expression (1-1) or (1-2). In particular, satisfying conditional expression (1-3) allows a light ray to be prevented from becoming excessively high at the first cemented lens and the following lenses. Accordingly, spherical aberrations and axial aberrations can be corrected in a preferable manner in addition to the Petzval sum.

$$2.6 \leq f1/fob \quad (1-1)$$

$$2.9 \leq f1/fob \quad (1-2)$$

$$f1/fob \leq 4.3 \quad (1-3)$$

In addition to the first cemented lens, the first lens group of the objective desirably includes another cemented lens. In addition, the first lens group desirably includes at least one cemented triplet lens. This allows chromatic aberrations to be corrected in a more preferable manner.

The meniscus lens component that is the closest to the image among the components of the first lens group may have a negative refractive power. This allows the Petzval sum to be corrected in a more preferable manner.

The objective may satisfy the following conditional expression:

$$0.095 \leq d12/L_{total} \quad (3)$$

In this conditional expression, d12 indicates a thickness that the meniscus lens included in the first cemented lens has on the optical axis; $L_{total}$, the distance on the optical axis from an object surface to the lens surface that is the closest to the image among the lens surfaces of the objective. The object surface refers to a surface that is distant from the lens surface that is the closest to the object among the lens surfaces of the objective (i.e., plane surface of the plano-convex lens of the objective) by a distance equivalent to the sum of a working distance and the thickness of cover glass.

Conditional expression (3) defines the thickness of the meniscus lens included in the first cemented lens. Satisfying conditional expression (3) allows the objective to correct the Petzval sum in a more preferable manner.

When $d12/L_{total}$ is lower than a lower limit of conditional expression (3), the meniscus lens included in the first cemented lens is excessively thin relative to the total length of the objective. Accordingly, a light ray is not sufficiently high in the first cemented lens, resulting in an axial marginal light ray becoming low in the lens components of the first lens group and the following lens components. This decreases the negative refractive power of the lens surface (concave surface) on the image side of the meniscus lens component that is the closest to the image among the components of the first lens group, thereby making it difficult to correct the Petzval sum.

The objective may satisfy conditional expression (3-1) instead of conditional expression (3). Alternatively, the objective may satisfy conditional expression (3-2) in addition to conditional expression (3) or (3-1). In particular, satisfying conditional expression (3-2) allows a sufficient space to be ensured for the lens components of the first cemented lens and the following lens components while the meniscus lens has a sufficient thickness to maintain a high light ray. Only few limitations are imposed on the lens components of the lens configurations of the first cemented lens and the following lens components so that spherical aberrations and axial chromatic aberrations can be corrected in a preferable manner in addition to the Petzval sum.

$$0.1 \leq d12/L_{total} \quad (3\text{-}1)$$

$$d12/L_{total} \leq 0.11 \quad (3\text{-}2)$$

The first lens group of the objective desirably includes a biconvex lens in addition to the first cemented lens. The biconvex lens is desirably included in the lens component that is the closest, second closest, or third closest to the object among the components of the objective. Since the lens component that is the closest to the object among the components of the objective is the first cemented lens, the biconvex lens is desirably included in the lens component that is the second or third closest to the object among the components of the objective.

To correct off-axis aberrations, a light ray height needs to be sufficiently increased by the first cemented lens and then increased or decreased, as appropriate, by the following lens components. The objective satisfies conditional expression (1) and thus emits a light ray forming a large angle with the optical axis from the first cemented lens. Providing a biconvex lens at a position that is not extremely distant from the first cemented lens and, in particular, providing a biconvex lens within the lens component that is the closest, second closest, or third closest to the object among the components of the objective allows a light ray forming a large angle that is emitted from the first cemented lens to be prevented from being excessively high. Hence, the light ray height can be increased or decreased efficiently by a compact lens configuration so that off-axis chromatic aberrations can be corrected in a preferable manner.

The above-described objective that includes a biconvex lens desirably satisfies the following conditional expression:

$$0.014 \leq NA_{ob}/|\beta| \leq 0.034 \quad (4)$$

In this conditional expression, $NA_{ob}$ indicates the numerical aperture on the object side of the objective; $\beta$, the magnification of the objective. The magnification of the objective, which is determined according to objective specifications, refers to a magnification achieved when the objective is combined with a tube lens having a focal length within a range from 180 mm to 200 mm. Note that for each objective, a focal length is set in advance for a tube lens to be combined with the objective.

Conditional expression (4) defines a relationship between the numerical aperture and magnification of the objective. Satisfying conditional expression (4) allows, among other things, brightness necessary for a fluorescence observation with a high magnification to be ensured.

When $NA_{ob}/|\beta|$ is lower than a lower limit of conditional expression (4), it is difficult to achieve sufficient brightness in an observation with a high magnification, resulting in a dark fluorescence image. When $NA_{ob}/|\beta|$ is higher than an upper limit of conditional expression (4), it is difficult to correct aberrations for a wide field of view due to the limited total length of the objective. Hence, it is difficult to observe a wide area with sufficient brightness.

The objective may satisfy conditional expression (4-1) or (4-2) instead of conditional expression (4).

$$0.017 \leq NA_{ob}/|\beta| 0.031 \quad (4\text{-}1)$$

$$0.02 \leq NA_{ob}/|\beta| 0.028 \quad (4\text{-}2)$$

In addition, the objective desirably satisfies at least either of the following conditional expressions:

$$1.4 \leq n13 \leq 1.85 \quad (5)$$

$$0 \leq |R1|/|R2| \leq 1 \quad (6)$$

In these conditional expressions, n13 indicates a refractive index that the biconvex lens included in the first lens group has for an e line; R1, a radius of curvature of the lens surface on the object side of the biconvex lens included in the first lens group; R2, a radius of curvature of the lens surface on the image side of the biconvex lens included in the first lens group.

Conditional expression (5) defines the refractive index of the biconcave lens included in the first lens group. Satisfying conditional expression (5) allows, among other things, high transmittance to be ensured for light in a near-ultraviolet region (including an i line) so that a fluorescence observation using excitation light having a short wavelength can be performed with a high resolution.

At present, no general-purpose glass materials have an n13 that is lower than a lower limit of conditional expression (5). If n13 is higher than an upper limit of conditional expression (5), this will be undesirable because it would be difficult to ensure sufficient transmittance for a short wavelength and in particular for a wavelength of 360 nm or lower. A fluorescence observation is such that a certain wavelength that falls within a range from an ultraviolet region to a visible region is selected to irradiate a sample with excitation light having this wavelength. Hence, a biological microscope preferably includes a microscope optical system that also has high transmittance for a wavelength of 360 nm or lower.

Conditional expression (6) defines the radius of curvature of the biconvex lens included in the first lens group. Satisfying conditional expression (6) allows a light ray to be largely bent at the lens surface of the biconvex lens on the object side so that aberrations that occur at positions in the vicinity of the edge of a field of view, such as coma aberrations, can be corrected effectively. Accordingly, a preferable performance can also be achieved for positions in the vicinity of the edge of the field of view.

The objective may satisfy conditional expression (5-1) or (5-2) in addition to conditional expression (5). In general, a lowly dispersive optical member is preferably used for a positive lens so as to correct chromatic aberrations. Satisfying conditional expression (5-1) or (5-2) allows a lowly dispersive glass material to be selected so that chromatic aberrations can be corrected in a more preferable manner.

$$n13 \leq 1.7 \tag{5-1}$$

$$n13 \leq 1.6 \tag{5-2}$$

The objective may satisfy conditional expression (6-1) or (6-2) in addition to conditional expression (6).

$$|R1|/|R2| \leq 0.85 \tag{6-1}$$

$$|R1|/|R2| \leq 0.7 \tag{6-2}$$

The objective may satisfy conditional expression (4) and the following conditional expression, where $P_{ob}$ indicates a Petzval sum of the objective for an e line.

$$P_{ob} \leq 0/mm \tag{7}$$

Conditional expression (7) defines the Petzval sum of the objective. When counterlight tracking is performed for an objective, a spherical aberration deviating from an object plane toward the objective typically occurs at an off-axis position. Satisfying conditional expression (7) allows an off-axis position in an optical axis direction at which an optimum image can be obtained to be comparable with an on-axis position in an optical axis direction at which an optimum image can be obtained. Accordingly, satisfying conditional expressions (4) and (7) allows a preferable edge-portion resolution to be achieved for a wide field of view.

The objective desirably satisfies conditional expression (7-1) instead of conditional expression (7). Satisfying conditional expression (7-1) allows a preferable edge-portion resolution to be achieved more efficiently. When $P_{ob}$ is lower than a lower limit of conditional expression (7-1), a light ray needs to be excessively high within the first lens group so as to ensure a negative refractive power. Accordingly, high-order spherical aberrations will be generated, thereby making it difficult to correct spherical aberrations.

$$-0.04/mm \leq P_{ob} \leq -0.01/mm \tag{7-1}$$

The objective may satisfy the following conditional expressions:

$$1.4 \leq NA_{ob} \tag{8}$$

$$-2 \leq \Delta_{z1}/DOF_e \leq 2 \tag{9}$$

In this conditional expression, $\Delta_{z1}$ indicates a difference between a position on the optical axis at which an RMS wave aberration in an h line is minimized (hereinafter referred to as an h-line minimization position) in counterlight tracking and a position on the optical axis at which an RMS wave aberration in an e line is minimized (hereinafter referred to as an e-line minimization position) in the counterlight tracking, and $DOF_e$ indicates a depth of focus for the e line. A position on the optical axis refers to a position on the optical axis within a region of the objective located on the object side. An expression for calculating the depth of focus $DOF_e$ is $DOF_e = n_{im} \times \lambda_e/(2 \times NA_{ob}^2)$, where $\lambda_e$ indicates the wavelength of the e line, and $n_{im}$ indicates the refractive index of the immersion liquid.

Conditional expression (8) is intended to achieve a sufficient resolution in an observation using the objective. When NAob is not lower than a lower limit of conditional expression (8), an Air disk diameter can be sufficiently small, and the depth of focus can also be small. Hence, a sufficient resolution can be achieved.

Conditional expression (9) is intended mainly to correct axial chromatic aberrations in a preferable manner. Optical systems of a biological microscope are often used to perform fluorescence observations using excitation light having a short wavelength close to an h line. Hence, axial chromatic aberration properties of the h line and an e line are important. When $\Delta_{z1}/DOF_e$ is higher than an upper limit or is lower than a lower limit, an excessively large axial chromatic aberration is caused by the objective. Hence, without significantly compensating for the axial chromatic aberration by using a tube lens, a large axial chromatic aberration would occur on an image surface. However, it is difficult in practice to compensate for a large axial chromatic aberration by using a tube lens. Compensating for an aberration by using a tube lens means providing the tube lens with an aberration. Hence, considering that the objective lens combined with the tube lens is switched between a plurality of objectives each having a different aberration property, it is not preferable to compensate for an axial chromatic aberration by using the tube lens. Satisfying conditional expression (9) allows the objective alone to correct an axial chromatic aberration in a preferable manner. In particular, an axial chromatic aberration can be corrected in a preferable manner even when light having a short wavelength such as the h line is used as excitation light.

The objective desirably satisfies conditional expression (8-1) in addition to conditional expression (8). Satisfying conditional expression (8-1) prevents a marginal light ray incident on the objective from having an excessively wide spread angle. Hence, coma aberrations, among other things, can be sufficiently corrected, with the result that a higher resolution can be achieved.

$$NA_{ob} \leq 1.51 \tag{8-1}$$

The objective desirably satisfies conditional expression (9-1) or (9-2) instead of conditional expression (9). In particular, satisfying conditional expression (9-2) makes a difference in minimization position between the h line and the e line equal to or less than the depth of focus multiplied by 1 so that axial chromatic aberrations can be corrected in a more preferable manner. Accordingly, misalignment of a sample caused by a chromatic aberration may be reduced even in multicolor imaging in which a microscope apparatus (e.g., a confocal microscope apparatus) having a resolution in an optical axis direction obtains images using a plurality of excitation wavelengths and overlays these images on each other.

$$-1.5 \leq \Delta_{z1}/DOF_e \leq 1.5 \quad (9\text{-}1)$$

$$-1 \leq \Delta_{z1}/DOF_e \leq 1 \quad (9\text{-}2)$$

In addition, the objective may satisfy the following conditional expression:

$$9 \text{ mm} \leq Y_{reso} \times |\beta| \leq 20 \text{ mm} \quad (10)$$

In this conditional expression, $Y_{reso}$ indicates a maximum object height within a region on a plane orthogonal to an optical axis that crosses the e-line minimization position, wherein the region is such that the RMS wave aberration in the e line in counterlight tracking is $0.2\lambda_e$ or lower, where $\lambda_e$ indicates the wavelength of the e line.

As depicted in FIG. 1, maximum object height $Y_{reso}$ is a maximum object height of a region 100 that satisfies a predetermined condition. Note that FIG. 1 depicts a cross section orthogonal to an optical axis of an objective that crosses an e-line minimization position (hereinafter referred to as an e-line minimization cross section). Maximum object height $Y_{reso}$ is determined as follows: First, (RMS wave aberration in the e line)/$\lambda_e$ is calculated for each point on the e-line minimization cross section. Second, a region 100 on the e-line minimization cross section that satisfies (RMS wave aberration in the e line)/$\lambda_e \leq 0.2$ is identified. Third, a point within the region 100 that is the most distant from an optical axis AX is identified as a point P1. Finally, the distance between the point P1 and the optical axis AX is calculated as maximum object height $Y_{reso}$.

When the objective has rotational symmetry, the region 100 also has rotational symmetry (i.e., a circular shape). Accordingly, the region 100 has a constant object height irrespective of orientation, and maximum object height $Y_{reso}$ is this constant object height. Meanwhile, when the objective has a manufacturing error, the region 100 has rotational asymmetry. As a result, the region 100 has an object height that depends on an orientation, as depicted in, for example, FIG. 1. In this case, maximum object height $Y_{reso}$ is an object height in an orientation in which the distance from the optical axis to a border of the region 100 is maximized.

Conditional expression (10) is a conditional expression for obtaining a preferable edge-portion resolution in an observation using the objective. An edge-portion resolution refers to a resolution for an edge portion of a field of view and tends to be degraded when a large off-axis aberration occurs. When $Y_{reso} \times |\beta|$ is lower than a lower limit of conditional expression (10), an excessively large off-axis aberration is caused by the objective, and the aberration needs to be significantly compensated for using a tube lens. However, it is difficult in practice to compensate for a large off-axis aberration by using a tube lens. In addition, compensating for an aberration by using a tube lens means providing the tube lens with an aberration. This is unfavorable for the reason described above with reference to conditional expression (9). When $Y_{reso} \times |\beta|$ is higher than an upper limit of conditional expression (10), a wide region with a preferable off-axis aberration is achieved in a primary image-forming position. However, it would not be preferable to obtain an image for this range because image sensors and units for holding the same would be large-sized. Satisfying at least conditional expressions (1) and (2) as well as conditional expression (10) allows a preferable edge-portion resolution to be achieved.

The objective desirably satisfies conditional expression (10-1) or (10-2) instead of conditional expression (10).

$$9.5 \text{ mm} \leq Y_{reso} \times |\beta| \leq 17 \text{ mm} \quad (10\text{-}1)$$

$$10 \text{ mm} \leq Y_{reso} \times |\beta| \leq 15 \text{ mm} \quad (10\text{-}2)$$

The objective may satisfy the following conditional expression, where $L_{total}$ indicates a distance on an optical axis from an object surface to the lens surface that is the closest to the image among the lens surfaces of the objective.

$$L_{total} \leq 100 \text{ mm} \quad (11)$$

Conditional expression (11) substantially defines the total length of the objective. Satisfying conditional expression (11) allows the objective and the entirety of an apparatus on which the objective is mounted to be small-sized.

The objective may use only one of the above-described conditional expressions or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the objective.

First Embodiment

Figure 2:
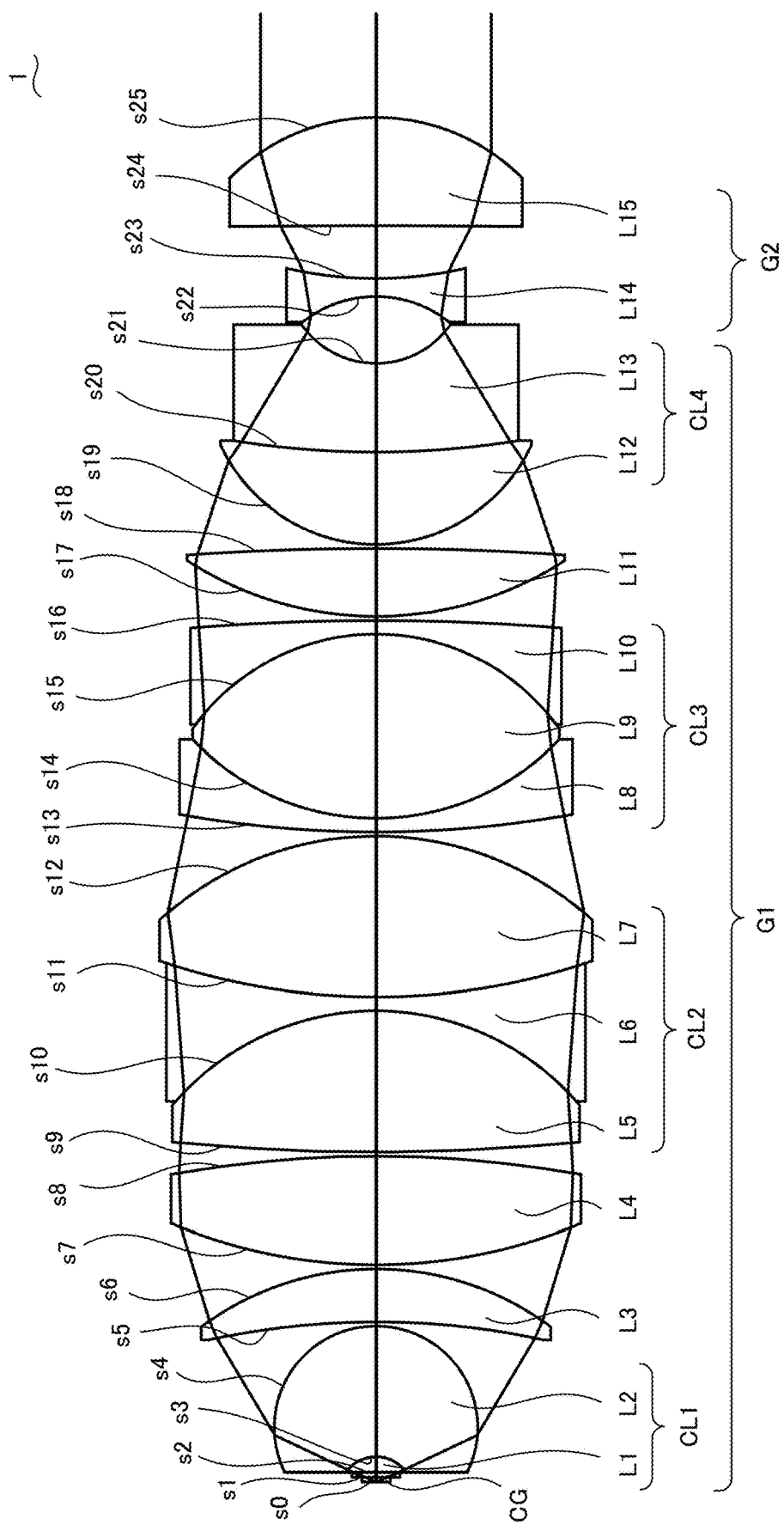
FIG. 2 is a cross-sectional view of an objective 1 in accordance with a first embodiment of the invention.

FIG. 2 is a cross-sectional view of an objective 1 in accordance with the present embodiment. The objective 1 includes: a first lens group G1 that includes a meniscus lens component that is the closest to an image among the components of the first lens group, the meniscus lens component having a convex surface facing an object; and a second lens group G2 that is closer to the image than the first lens group G1 is. The second lens group G2 includes at least one lens component. Note that the objective 1 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a biconvex lens, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 consists of a lens L1 that is a planoconvex lens having a plane surface facing the object and a lens L2 that is a meniscus lens that has a negative refractive power and includes a concave surface facing the object, wherein the object, the lens L1, and the lens L2 are arranged in this order. The cemented lens CL2 is a cemented triplet lens and consists of: a lens L5 that is a biconvex lens; a lens L6 that is a biconcave lens; and a lens L7 that is a biconvex lens, wherein the object, the lens L5, the lens L6, and the lens L7 are arranged in this order. The cemented lens CL3 is a cemented triplet cemented lens and consists of: a lens L8 that is a meniscus lens having a concave surface facing the image; a lens L9 that is a biconvex lens; and a lens L10 that is a meniscus lens having a concave surface facing the object, wherein the object, the lens L8, the lens L9, and the lens L10 are arranged in this order. The cemented lens CL4 is a cemented doublet lens and consists of: a lens L12 that is a meniscus lens having a concave surface facing the image; and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 1, where $\Phi_1$ indicates the outer diameter of the lens L13, i.e., the lens that is the closest to the image among the lenses of the cemented lens CL4, wherein the cemented lens CL4 is the meniscus lens component that is the closest to the image among the components of the first lens group G1.

f1=7.972 mm, fob=2.987 mm, n12=1.808, d12=4.764 mm, $L_{total}$=49.620 mm, $|\beta|$=60.258, n13=1.571, R1=19.135 mm, R2=−41.837 mm, $P_{ob}$=−0.021/mm, $NA_{ob}$=1.403, $\Delta_{z1}$=−0.011 μm, $DOF_e$=0.210 μm, $Y_{reso}$=0.144 mm, $\Phi_1$=11 mm The following are lens data of the objective 1. INF in the lens data indicates infinity (∞).

Objective 1

| s | r | d | ne | nh | vd |
|---|---|---|---|---|---|
| 0 | INF | 0.1700 | 1.52626 | 1.54042 | 54.41 |
| 1 | INF | 0.1800 | 1.51793 | 1.53747 | 41.00 |
| 2 | INF | 0.5500 | 1.51825 | 1.52977 | 64.14 |
| 3 | −1.3126 | 4.7638 | 1.80811 | 1.83380 | 46.57 |
| 4 | −3.6916 | 0.1500 | | | |
| 5 | −28.6480 | 1.9283 | 1.57098 | 1.58258 | 71.30 |
| 6 | −10.6109 | 0.1500 | | | |
| 7 | 19.1349 | 3.9450 | 1.57098 | 1.58258 | 71.30 |
| 8 | −41.8367 | 0.1500 | | | |
| 9 | 76.4362 | 5.1443 | 1.43986 | 1.44647 | 94.66 |
| 10 | −9.6779 | 0.5000 | 1.64132 | 1.66385 | 42.41 |
| 11 | 24.2989 | 5.8504 | 1.43986 | 1.44647 | 94.66 |
| 12 | −11.6353 | 0.1500 | | | |
| 13 | 40.0585 | 0.5000 | 1.64132 | 1.66385 | 42.41 |
| 14 | 9.1821 | 6.6916 | 1.43986 | 1.44647 | 94.66 |
| 15 | −8.1587 | 0.5000 | 1.64132 | 1.66385 | 42.41 |
| 16 | −81.3837 | 0.1500 | | | |
| 17 | 12.6033 | 2.4741 | 1.57098 | 1.58258 | 71.30 |
| 18 | −101.2901 | 0.1500 | | | |
| 19 | 6.2229 | 3.3420 | 1.57098 | 1.58258 | 71.30 |
| 20 | 31.7183 | 3.2378 | 1.83945 | 1.86892 | 42.74 |
| 21 | 3.2797 | 2.4336 | | | |
| 22 | −4.2529 | 0.6596 | 1.77621 | 1.79917 | 49.60 |
| 23 | 14.2972 | 1.9038 | | | |
| 24 | −317.4945 | 3.9456 | 1.74340 | 1.77943 | 32.33 |
| 25 | −7.4941 | | | | | s indicates a surface number; r, a radius of curvature (mm); d, a surface interval (mm); ne, a refractive index for an e line; nh, a refractive index for an h line; vd, an Abbe number. These marks are also applicable to the embodiments described hereinafter. Surface numbers s0 and s1 respectively indicate an object surface (surface of cover glass CG on an object side) and a surface of the cover glass CG on an image side. Surface numbers s2 and s25 respectively indicate a lens surface that is the closest to an object among the lens surfaces of the objective 1 and a lens surface that is the closest to an image among the lens surfaces of the objective 1. A space between the surface identified as surface number s1 and the surface identified as surface number s2 is filled with an immersion liquid.

As indicated in the following, the objective 1 satisfies conditional expressions (1)-(9) and conditional expression (11).

$$f1/fob=2.67 \tag{1}$$

$$n12=1.808 \tag{2}$$

$$d12/L_{total}=0.096 \tag{3}$$

$$NA_{ob}/|\beta|=0.0233 \tag{4}$$

$$n13=1.571 \tag{5}$$

$$|R1|/|R2|=0.457 \tag{6}$$

$$P_{ob}=-0.021/\text{mm} \tag{7}$$

$$NA_{ob}=1.4034 \tag{8}$$

$$\Delta_{z1}/DOF_e=-0.05 \tag{9}$$

$$Y_{reso}\times|\beta|=8.65 \text{ mm} \tag{10}$$

$$L_{total}=49.620 \text{ mm} \tag{11}$$

Figure 3:
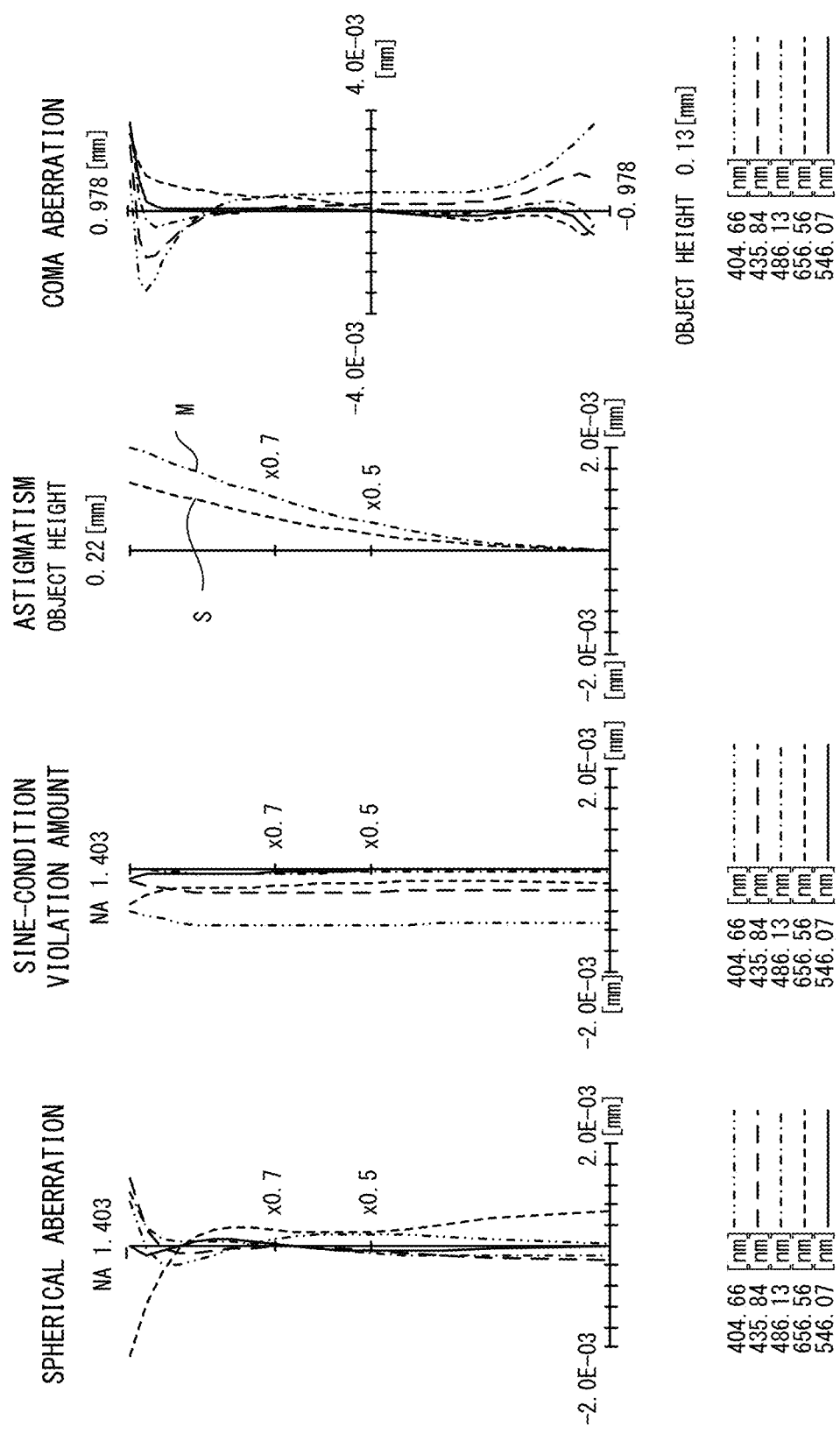
FIGS. 3A-3D are each an aberration diagram for an objective 1 depicted in FIG. 2.

FIGS. 3A-3D are each an aberration diagram for the objective 1 depicted in FIG. 2 and indicate aberrations that occur on an object surface when a pencil of infinitely distant light is incident from an image side. FIG. 3A is a spherical aberration diagram. FIG. 3B illustrates a sine-condition violation amount. FIG. 3C is an astigmatism diagram. FIG. 3D is a coma aberration diagram for a position with an object height ratio of 0.6 (object height 0.13 mm). "M" in the figures indicates a meridional component, and "S" indicates a sagittal component.

Second Embodiment

Figure 4:
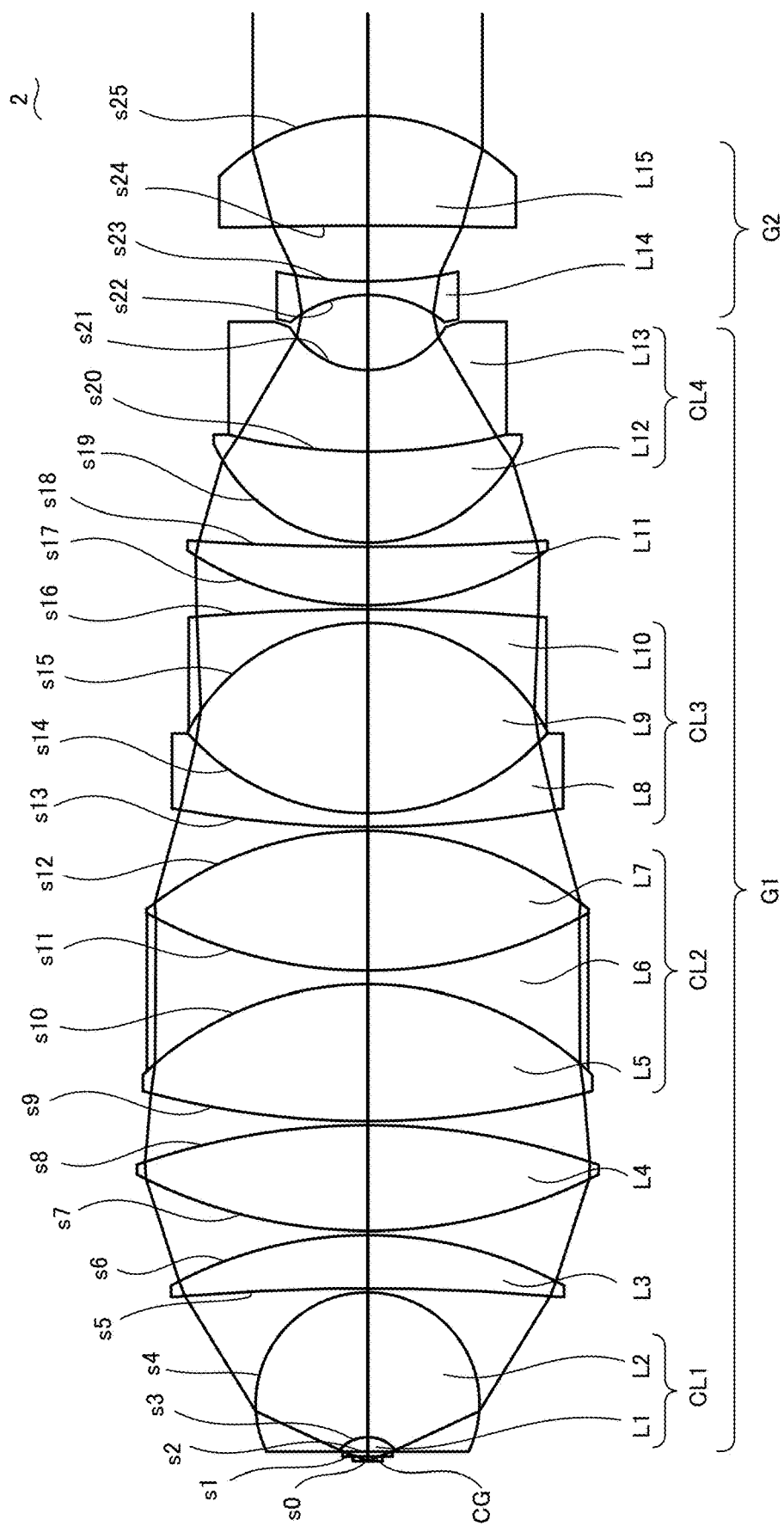
FIG. 4 is a cross-sectional view of an objective 2 in accordance with a second embodiment of the invention.

FIG. 4 is a cross-sectional view of an objective 2 in accordance with the present embodiment. The objective 2 includes: a first lens group G1 that includes a meniscus lens component that is the closest to an image among the components of the first lens group, the meniscus lens component having a convex surface facing an object; and a second lens group G2 that is closer to the image than the first lens group G1 is. The second lens group G2 includes at least one lens component. Note that the objective 2 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a meniscus lens having a concave surface facing the image, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 consists of a lens L1 that is a planoconvex lens having a plane surface facing the object and a lens L2 that is a meniscus lens that has a negative refractive power and includes a concave surface facing the object, wherein the object, the lens L1, and the lens L2 are arranged in this order. The cemented lens CL2 is a cemented triplet lens and consists of: a lens L5 that is a biconvex lens; a lens L6 that is a biconcave lens; and a lens L7 that is a biconvex lens, wherein the object, the lens L5, the lens L6, and the lens L7 are arranged in this order. The cemented lens CL3 is a cemented triplet lens and consists of: a lens L8 that is a meniscus lens having a concave surface facing the image; a lens L9 that is a biconvex lens; and a lens L10 that is a meniscus lens having a concave surface facing the object, wherein the object, the lens L8, the lens L9, and the lens L10 are arranged in this order. The cemented lens CL4 is a cemented doublet lens and consists of: a lens L12 that is a meniscus lens having a concave surface facing the image; and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 2, where $\Phi_1$ indicates the outer diameter of the lens L13, i.e., the lens that is the closest to the image among the lenses of the cemented lens CL4, wherein the cemented lens CL4 is the meniscus lens component that is the closest to the image among the components of the first lens group G1.

f1=9.544 mm, fob=2.999 mm, n12=1.839, d12=5.348 mm, $L_{total}$=49.620 mm, $|\beta|$=60.017, n13=1.440, R1=18.406 mm, R2=−25.319 mm, $P_{ob}$=−0.029/mm, $NA_{ob}$=1.410, $\Delta_{z1}$=0.017 μm, $DOF_e$=0.208 μm, $Y_{reso}$=0.177 mm, $\Phi_1$=10.4 mm The following are lens data of the objective 2.

| Objective 2 | | | | | |
|---|---|---|---|---|---|
| s | r | d | ne | nh | vd |
| 0 | INF | 0.1700 | 1.52626 | 1.54042 | 54.41 |
| 1 | INF | 0.1800 | 1.51793 | 1.53747 | 41.00 |
| 2 | INF | 0.5400 | 1.51825 | 1.52977 | 64.14 |
| 3 | −1.3190 | 5.3481 | 1.83945 | 1.86893 | 42.73 |
| 4 | −4.1166 | 0.1500 | | | |
| 5 | −78.3319 | 1.9634 | 1.57098 | 1.58258 | 71.30 |
| 6 | −14.9285 | 0.1500 | | | |
| 7 | 18.4060 | 3.8953 | 1.43986 | 1.44647 | 94.66 |
| 8 | −25.3193 | 0.1500 | | | |
| 9 | 31.1937 | 5.0462 | 1.43986 | 1.44647 | 94.66 |
| 10 | −11.9163 | 0.5000 | 1.64132 | 1.66385 | 42.41 |
| 11 | 16.5897 | 5.1624 | 1.43986 | 1.44647 | 94.66 |
| 12 | −12.8588 | 0.1500 | | | |
| 13 | 38.1374 | 0.5000 | 1.64132 | 1.66385 | 42.41 |
| 14 | 8.9209 | 7.0201 | 1.43986 | 1.44647 | 94.66 |
| 15 | −7.4439 | 0.5000 | 1.61664 | 1.63723 | 44.49 |
| 16 | −71.7589 | 0.1500 | | | |
| 17 | 11.8705 | 2.1645 | 1.57098 | 1.58258 | 71.30 |
| 18 | 96.6908 | 0.1500 | | | |
| 19 | 6.2225 | 3.3392 | 1.57098 | 1.58258 | 71.30 |
| 20 | 21.2446 | 3.0160 | 1.83945 | 1.86893 | 42.73 |
| 21 | 3.3871 | 2.7792 | | | |
| 22 | −4.4975 | 0.5000 | 1.77621 | 1.79917 | 49.60 |
| 23 | 15.9215 | 2.0396 | | | |
| 24 | −160.5239 | 4.0560 | 1.74341 | 1.77951 | 32.26 |
| 25 | −7.7872 | | | | |

As indicated in the following, the objective 2 satisfies conditional expressions (1)-(11).

$$f1/fob=3.18 \tag{1}$$

$$n12=1.839 \tag{2}$$

$$d12/L_{total}=0.108 \tag{3}$$

$$NA_{ob}/|\beta|=0.0235 \tag{4}$$

$$n13=1.440 \tag{5}$$

$$|R1|/|R2|=0.727 \tag{6}$$

$$P_{ob}=-0.029/\text{mm} \tag{7}$$

$$NA_{ob}=1.4099 \tag{8}$$

$$\Delta_{z1}/DOF_e=-0.08 \tag{9}$$

$$Y_{reso}\times|\beta|=10.60 \text{ mm} \tag{10}$$

$$L_{total}=49.620 \text{ mm} \tag{11}$$

Figure 5:
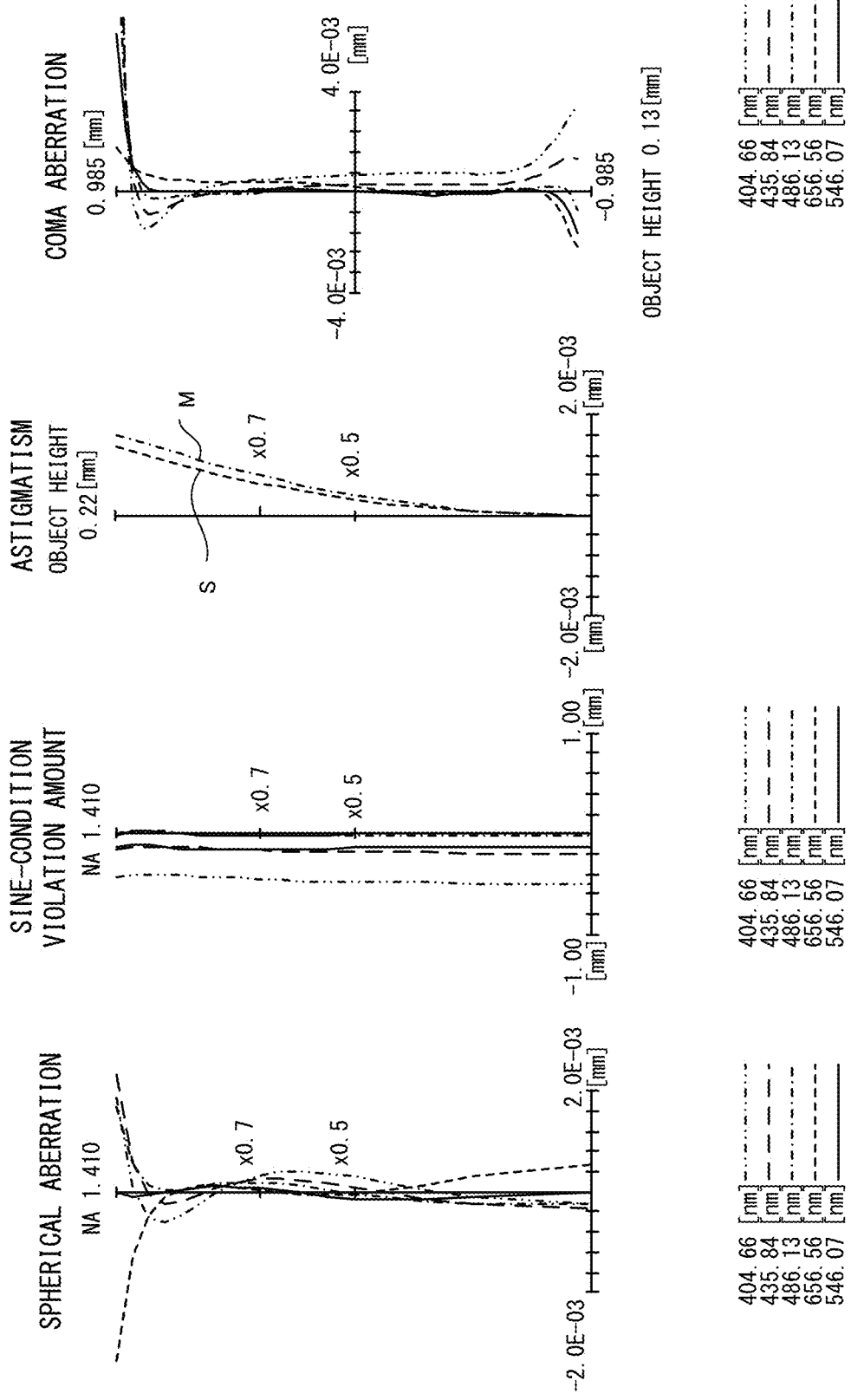
FIGS. 5A-5D are each an aberration diagram for an objective 2 depicted in FIG. 4.

FIGS. 5A-5D are each an aberration diagram for the objective 2 depicted in FIG. 4 and indicate aberrations that occur on an object surface when a pencil of infinitely distant light is incident from an image side. FIG. 5A is a spherical aberration diagram. FIG. 5B illustrates a sine-condition violation amount. FIG. 5C is an astigmatism diagram. FIG. 5D is a coma aberration diagram for a position with an object height ratio of 0.6 (object height 0.13 mm).

Third Embodiment

Figure 6:
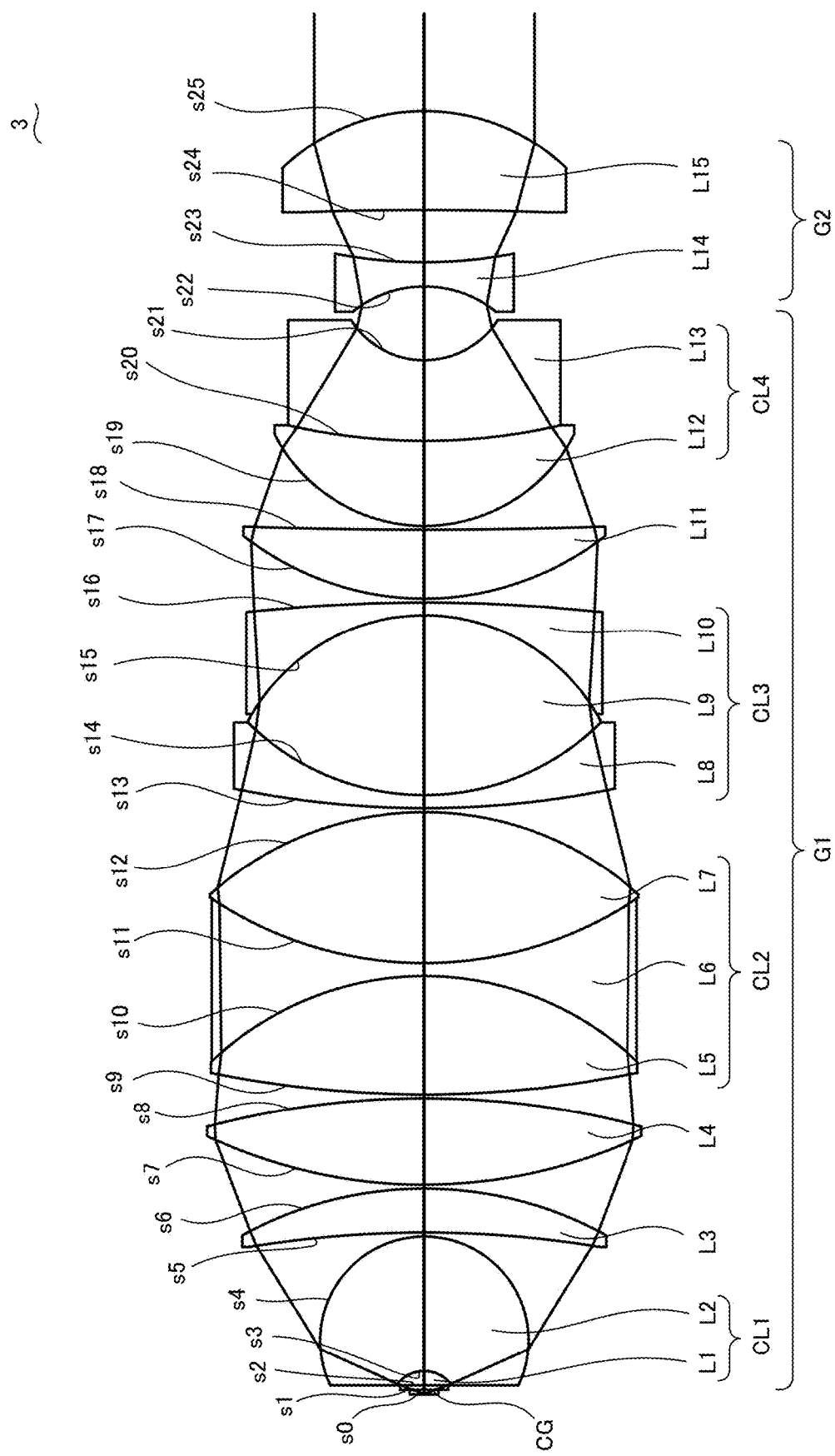
FIG. 6 is a cross-sectional view of an objective 3 in accordance with a third embodiment of the invention.

FIG. 6 is a cross-sectional view of an objective 3 in accordance with the present embodiment. The objective 3 includes: a first lens group G1 that includes a meniscus lens component that is the closest to an image among the components of the first lens group, the meniscus lens component having a convex surface facing an object; and a second lens group G2 that is closer to the image than the first lens group G1 is. The second lens group G2 includes at least one lens component. Note that the objective 3 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a meniscus lens having a concave surface facing the image, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 consists of a lens L1 that is a planoconvex lens having a plane surface facing the object and a lens L2 that is a meniscus lens that has a negative refractive power and includes a concave surface facing the object, wherein the object, the lens L1, and the lens L2 are arranged in this order. The cemented lens CL2 is a cemented triplet lens and consists of: a lens L5 that is a biconvex lens; a lens L6 that is a biconcave lens; and a lens L7 that is a biconvex lens, wherein the object, the lens L5, the lens L6, and the lens L7 are arranged in this order. The cemented lens CL3 is a cemented triplet lens and consists of: a lens L8 that is a meniscus lens having a concave surface facing the image; a lens L9 that is a biconvex lens; and a lens L10 that is a meniscus lens having a concave surface facing the object, wherein the object, the lens L8, the lens L9, and the lens L10 are arranged in this order. The cemented lens CL4 is a cemented doublet lens and consists of: a lens L12 that is a meniscus lens having a concave surface facing the image; and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 3, where $\Phi_1$ indicates the outer diameter of the lens L13, i.e., the lens that is the closest to the image among the lenses of the cemented lens CL4, wherein the cemented lens CL4 is the meniscus lens component that is the closest to the image among the components of the first lens group G1.

f1=9.383 mm, fob=2.999 mm, n12=1.839, d12=5.203 mm, $L_{total}$=49.620 mm, $|\beta|$=60.018, n13=1.571, R1=19.581 mm, R2=−32.253 mm, $P_{ob}$=−0.030/mm, $NA_{ob}$=1.415, $\Delta_{z1}$=0.033 μm, $DOF_e$=0.207 μm, $Y_{reso}$=0.166 mm, $\Phi_1$=11.2 mm The following are lens data of the objective 3.

Objective 3

| s | r | d | ne | nh | vd |
|---|---|---|---|---|---|
| 0 | INF | 0.1700 | 1.52626 | 1.54042 | 54.41 |
| 1 | INF | 0.1801 | 1.51793 | 1.53747 | 41.00 |
| 2 | INF | 0.5525 | 1.51825 | 1.52977 | 64.14 |
| 3 | −1.2880 | 5.2034 | 1.83945 | 1.86892 | 42.74 |
| 4 | −4.0219 | 0.1500 | | | |
| 5 | −40.9917 | 1.6998 | 1.57098 | 1.58258 | 71.30 |
| 6 | −14.5548 | 0.1500 | | | |
| 7 | 19.5814 | 3.3455 | 1.57098 | 1.58258 | 71.30 |
| 8 | −32.2528 | 0.1500 | | | |
| 9 | 40.7795 | 4.5709 | 1.43986 | 1.44647 | 94.66 |
| 10 | −11.8340 | 0.5000 | 1.64132 | 1.66385 | 42.41 |
| 11 | 14.7222 | 5.8461 | 1.43986 | 1.44647 | 94.66 |
| 12 | −12.2707 | 0.1500 | | | |
| 13 | 35.8722 | 0.5000 | 1.64132 | 1.66385 | 42.41 |
| 14 | 9.6567 | 6.9499 | 1.43986 | 1.44647 | 94.66 |
| 15 | −7.6900 | 0.5000 | 1.64132 | 1.66385 | 42.41 |
| 16 | −64.1462 | 0.1500 | | | |
| 17 | 11.2219 | 2.6566 | 1.57098 | 1.58258 | 71.30 |
| 18 | 183.1800 | 0.1500 | | | |
| 19 | 6.4903 | 3.2831 | 1.57098 | 1.58258 | 71.30 |
| 20 | 23.4041 | 3.1274 | 1.83945 | 1.86892 | 42.74 |
| 21 | 3.3607 | 2.8479 | | | |
| 22 | −4.4146 | 0.9358 | 1.77621 | 1.79917 | 49.60 |
| 23 | 18.4288 | 2.0100 | | | |
| 24 | −145.3293 | 3.8411 | 1.74340 | 1.77943 | 32.33 |
| 25 | −7.8414 | | | | |

As indicated in the following, the objective 3 satisfies conditional expressions (1)-(11).

$$f1/fob=3.13 \quad (1)$$

$$n12=1.839 \quad (2)$$

$$d12/L_{total}=0.105 \quad (3)$$

$$NA_{ob}/|\beta|=0.0236 \quad (4)$$

$$n13=1.571 \quad (5)$$

$$|R1|/|R2|=0.607 \quad (6)$$

$$P_{ob}=-0.030/mm \quad (7)$$

$$NA_{ob}=1.4151 \quad (8)$$

$$\Delta_{z1}/DOF_e=-0.16 \quad (9)$$

$$Y_{reso}\times|\beta|=9.94 \text{ mm} \quad (10)$$

$$L_{total}=49.620 \text{ mm} \quad (11)$$

Figure 7:
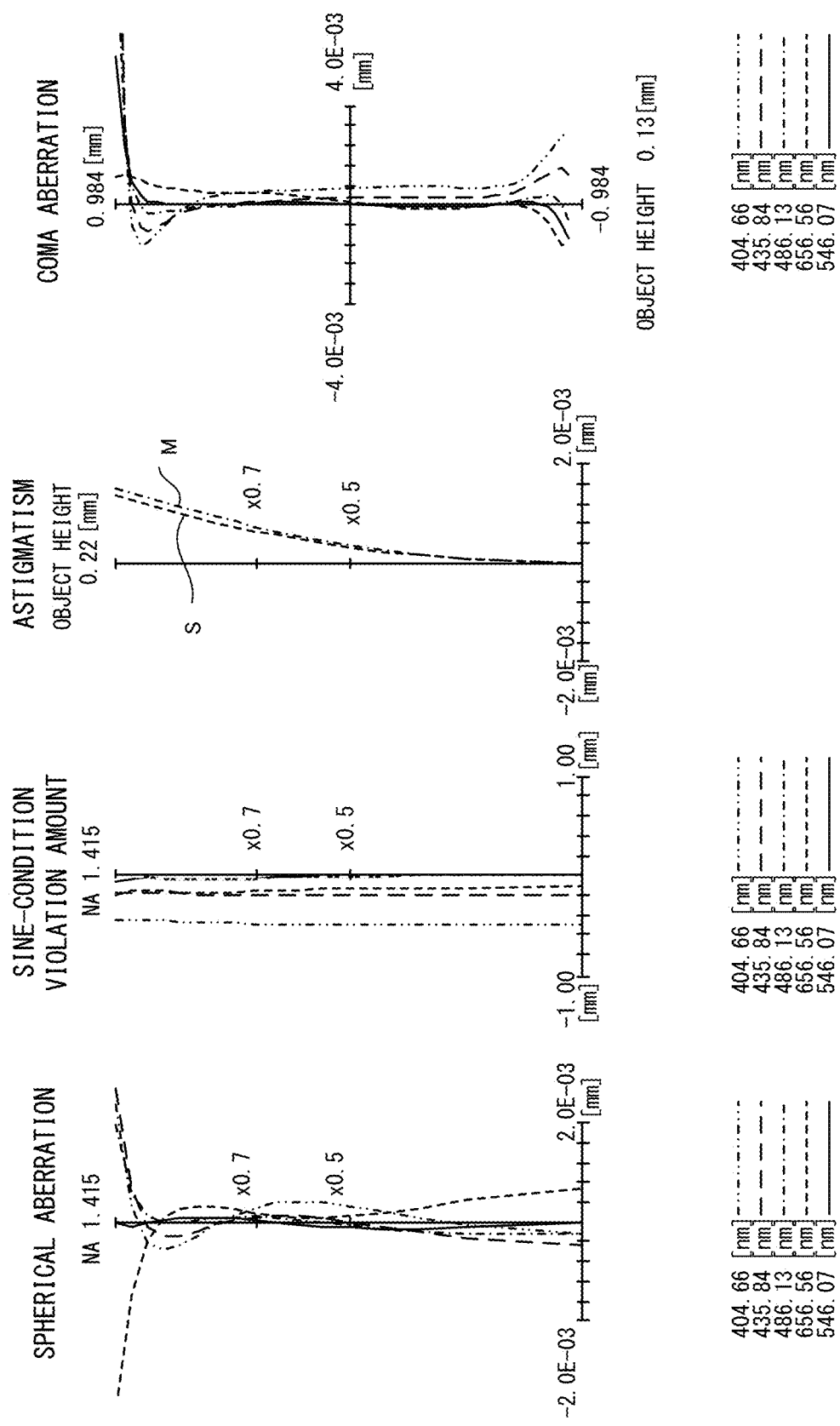
FIGS. 7A-7D are each an aberration diagram for an objective 3 depicted in FIG. 6.

FIGS. 7A-7D are each an aberration diagram for the objective 3 depicted in FIG. 6 and indicate aberrations that occur on an object surface when a pencil of infinitely distant light is incident from an image side. FIG. 7A is a spherical aberration diagram. FIG. 7B illustrates a sine-condition violation amount. FIG. 7C is an astigmatism diagram. FIG. 7D is a coma aberration diagram for a position with an object height ratio of 0.6 (object height 0.13 mm).

Fourth Embodiment

Figure 8:
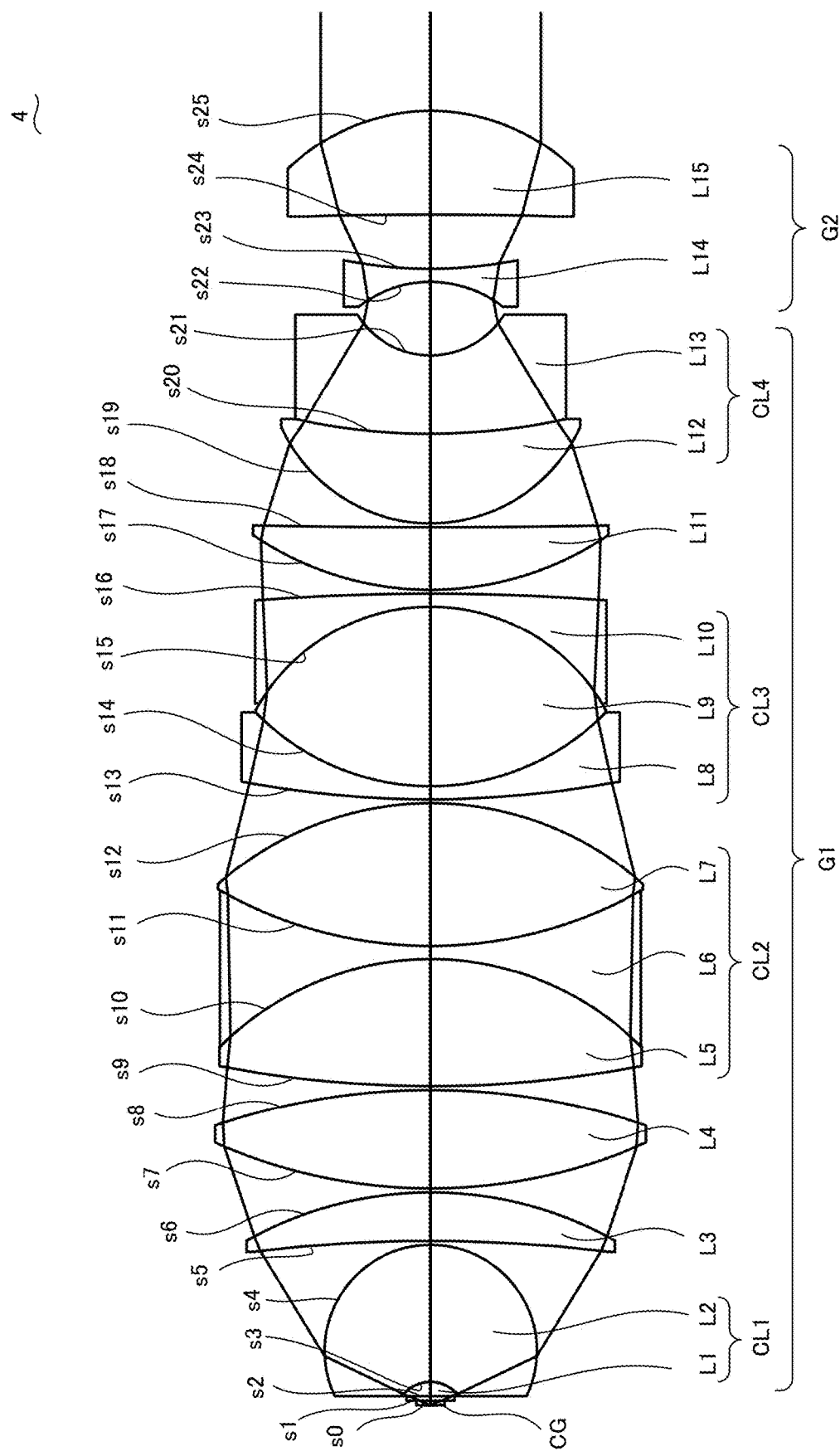
FIG. 8 is a cross-sectional view of an objective 4 in accordance with a fourth embodiment of the invention.

FIG. 8 is a cross-sectional view of an objective 4 in accordance with the present embodiment. The objective 4 includes: a first lens group G1 that includes a meniscus lens component that is the closest to an image among the components of the first lens group, the meniscus lens component having a convex surface facing an object; and a second lens group G2 that is closer to the image than the first lens group G1 is. The second lens group G2 includes at least one lens component. Note that the objective 4 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a meniscus lens having a concave surface facing the image, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 consists of a lens L1 that is a planoconvex lens having a plane surface facing the object and a lens L2 that is a meniscus lens that has a negative refractive power and includes a concave surface facing the object, wherein the object, the lens L1, and the lens L2 are arranged in this order. The cemented lens CL2 is a cemented triplet lens and consists of: a lens L5 that is a biconvex lens; a lens L6 that is a biconcave lens; and a lens L7 that is a biconvex lens, wherein the object, the lens L5, the lens L6, and the lens L7 are arranged in this order. The cemented lens CL3 is a cemented triplet lens and consists of: a lens L8 that is a meniscus lens having a concave surface facing the image; a lens L9 that is a biconvex lens; and a lens L10 that is a meniscus lens having a concave surface facing the object, wherein the object, the lens L8, the lens L9, and the lens L10 are arranged in this order. The cemented lens CL4 is a cemented doublet lens and consists of: a lens L12 that is a meniscus lens having a concave surface facing the image; and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 4, where $\Phi_1$ indicates the outer diameter of the lens L13, i.e., the lens that is the closest to the image among the lenses of the cemented lens CL4, wherein the cemented lens CL4 is the meniscus lens component that is the closest to the image among the components of the first lens group G1.

f1=9.130 mm, fob=2.999 mm, n12=1.839, d12=5.262 mm, $L_{total}$=49.620 mm, $|\beta|$=60.018, n13=1.498, R1=20.191 mm, R2=−25.496 mm, $P_{ob}$=−0.028/mm, $NA_{ob}$=1.405, $\Delta_{z1}$=0.037 µm, $DOF_e$=0.210 µm, $Y_{reso}$=0.177 mm, $\Phi_1$=11 mm The following are lens data of the objective 4.

| | | Objective 4 | | | |
|---|---|---|---|---|---|
| s | r | d | ne | nh | vd |
| 0 | INF | 0.1700 | 1.52626 | 1.54042 | 54.41 |
| 1 | INF | 0.1800 | 1.51793 | 1.53747 | 41.00 |
| 2 | INF | 0.5400 | 1.51825 | 1.52977 | 64.14 |
| 3 | −1.3511 | 5.2620 | 1.83945 | 1.86893 | 42.73 |
| 4 | −4.0613 | 0.1500 | | | |
| 5 | −56.4410 | 1.8577 | 1.57098 | 1.58258 | 71.30 |
| 6 | −14.3302 | 0.1500 | | | |
| 7 | 20.1909 | 3.7800 | 1.49846 | 1.50720 | 81.54 |
| 8 | −25.4964 | 0.1500 | | | |
| 9 | 42.8022 | 4.8603 | 1.43986 | 1.44647 | 94.66 |
| 10 | −11.3345 | 0.5000 | 1.64132 | 1.66385 | 42.41 |
| 11 | 16.2973 | 5.4810 | 1.43986 | 1.44647 | 94.66 |
| 12 | −12.1859 | 0.1500 | | | |
| 13 | 38.6809 | 0.5000 | 1.64132 | 1.66385 | 42.41 |
| 14 | 9.3245 | 6.8839 | 1.43986 | 1.44647 | 94.66 |
| 15 | −7.6204 | 0.5000 | 1.61664 | 1.63723 | 44.49 |
| 16 | −87.9248 | 0.1500 | | | |
| 17 | 12.0653 | 2.3897 | 1.57098 | 1.58258 | 71.30 |
| 18 | 323.1524 | 0.1500 | | | |
| 19 | 6.2659 | 3.4278 | 1.57098 | 1.58258 | 71.30 |
| 20 | 24.0937 | 3.0171 | 1.83945 | 1.86893 | 42.73 |
| 21 | 3.3168 | 2.8110 | | | |
| 22 | −4.4778 | 0.5000 | 1.77621 | 1.79917 | 49.60 |
| 23 | 17.0513 | 2.0803 | | | |
| 24 | −140.6625 | 3.9792 | 1.74341 | 1.77951 | 32.26 |
| 25 | −7.7810 | | | | |

As indicated in the following, the objective 4 satisfies conditional expressions (1)-(11).

$$f1/fob=3.04 \quad (1)$$

$$n12=1.839 \quad (2)$$

$$d12/L_{total}=0.106 \quad (3)$$

$$NA_{ob}/|\beta|=0.0234 \quad (4)$$

$$n13=1.498 \quad (5)$$

$$|R1|/|R2|=0.792 \quad (6)$$

$$P_{ob}=-0.028/\text{mm} \quad (7)$$

$$NA_{ob}=1.4052 \quad (8)$$

$$\Delta_{z1}/DOF_e=-0.18 \quad (9)$$

$$Y_{reso}\times|\beta|=10.60 \text{ mm} \quad (10)$$

$$L_{total}=49.620 \text{ mm} \quad (11)$$

Figure 9:
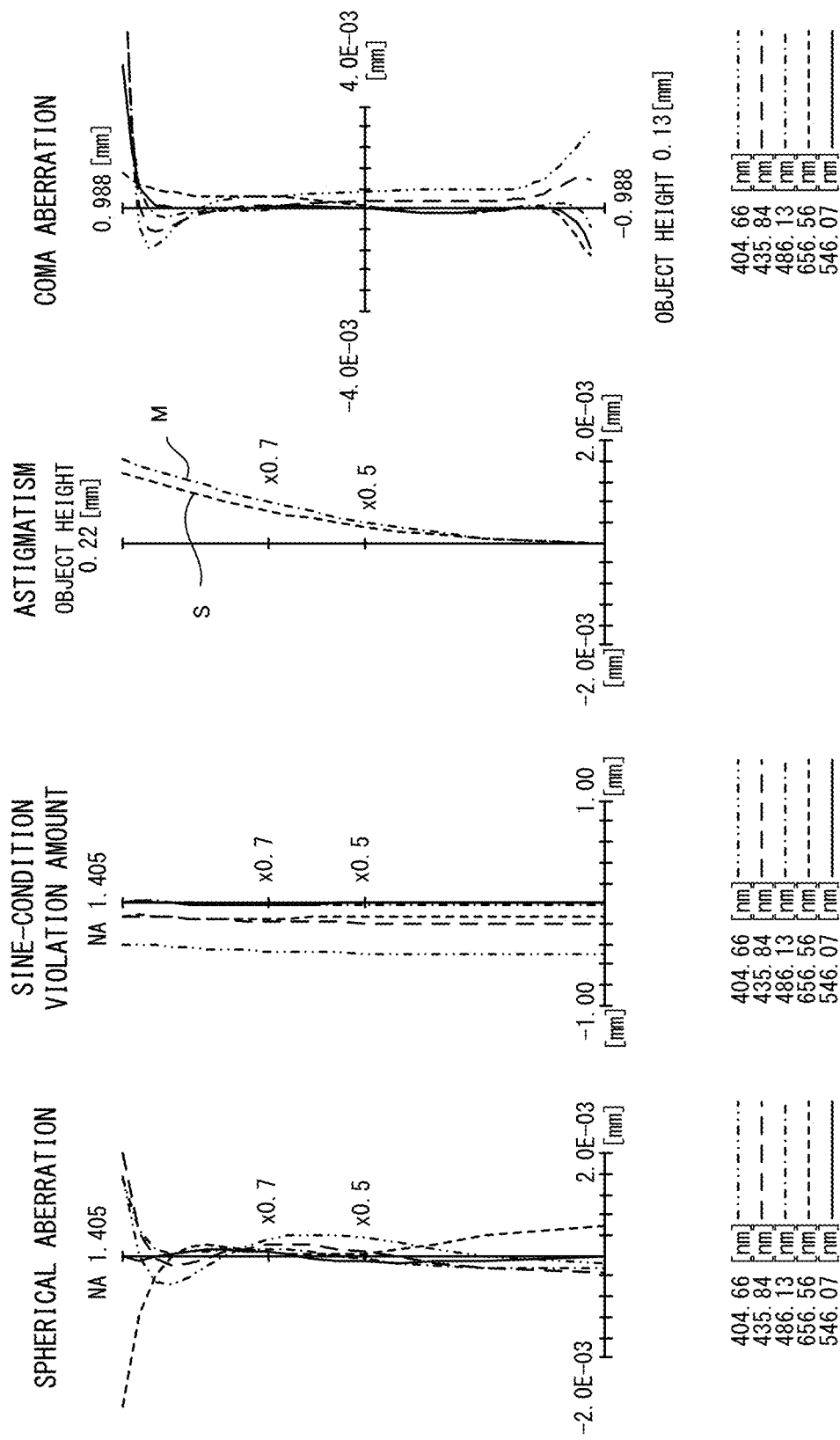
FIGS. 9A-9D are each an aberration diagram for an objective 4 depicted in FIG. 8.

FIGS. 9A-9D are each an aberration diagram for the objective 4 depicted in FIG. 8 and indicate aberrations that occur on an object surface when a pencil of infinitely distant light is incident from an image side. FIG. 9A is a spherical aberration diagram. FIG. 9B illustrates a sine-condition violation amount. FIG. 9C is an astigmatism diagram. FIG. 9D is a coma aberration diagram for a position with an object height ratio of 0.6 (object height 0.13 mm).

Fifth Embodiment

Figure 10:
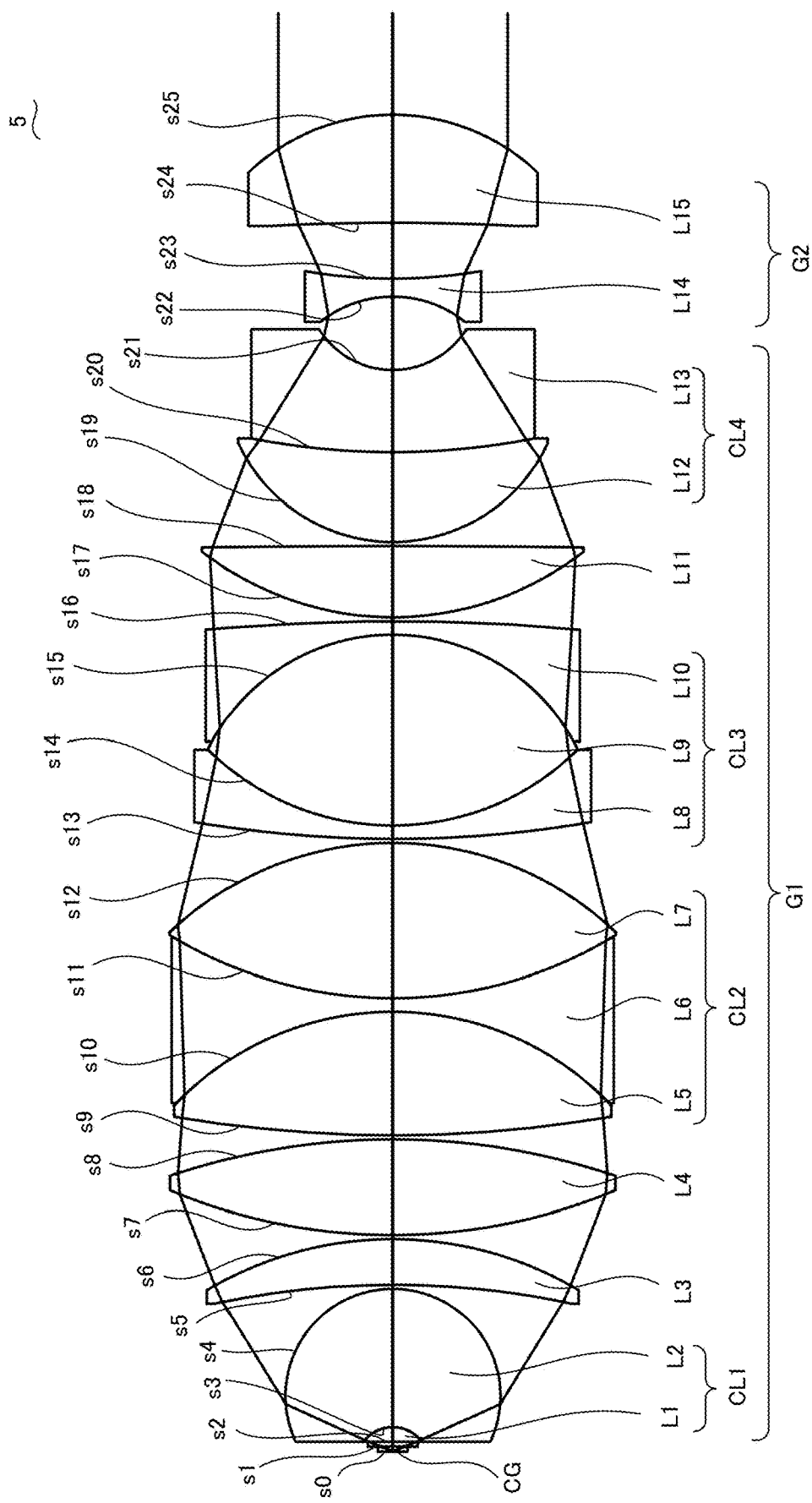
FIG. 10 is a cross-sectional view of an objective 5 in accordance with a fifth embodiment of the invention.

FIG. 10 is a cross-sectional view of an objective 5 in accordance with the present embodiment. The objective 5 includes: a first lens group G1 that includes a meniscus lens component that is the closest to an image among the components of the first lens group, the meniscus lens component having a convex surface facing an object; and a second lens group G2 that is closer to the image than the first lens group G1 is. The second lens group G2 includes at least one lens component. Note that the objective 5 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a biconvex lens, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 consists of a lens L1 that is a planoconvex lens having a plane surface facing the object and a lens L2 that is a meniscus lens that has a negative refractive power and includes a concave surface facing the object, wherein the object, the lens L1, and the lens L2 are arranged in this order. The cemented lens CL2 is a cemented triplet lens and consists of: a lens L5 that is a biconvex lens; a lens L6 that is a biconcave lens; and a lens L7 that is a biconvex lens, wherein the object, the lens L5, the lens L6, and the lens L7 are arranged in this order. The cemented lens CL3 is a cemented triplet lens and consists of: a lens L8 that is a meniscus lens having a concave surface facing the image; a lens L9 that is a biconvex lens; and a lens L10 that is a meniscus lens having a concave surface facing the object, wherein the object, the lens L8, the lens L9, and the lens L10 are arranged in this order. The cemented lens CL4 is a cemented doublet lens and consists of: a lens L12 that is a meniscus lens having a concave surface facing the image; and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 5, where $\Phi_1$ indicates the outer diameter of the lens L13, i.e., the lens that is the closest to the image among the lenses of the cemented lens CL4, wherein the cemented lens CL4 is the meniscus lens component that is the closest to the image among the components of the first lens group G1.

f1=8.830 mm, fob=2.999 mm, n12=1.839, d12=5.142 mm, $L_{total}$=49.620 mm, $|\beta|$=60.017, n13=1.571, R1=21.482 mm, R2=−25.852 mm, $P_{ob}$=−0 0.031/mm, $NA_{ob}$=1.416, $\Delta_{z1}$=0.017 µm, $DOF_e$=0.207 µm, $Y_{reso}$=0.166 mm, $\Phi_1$=11 mm The following are lens data of the objective 5.

| | | Objective 5 | | | |
|---|---|---|---|---|---|
| s | r | d | ne | nh | vd |
| 0 | INF | 0.1700 | 1.52626 | 1.54042 | 54.41 |
| 1 | INF | 0.1800 | 1.51793 | 1.53747 | 41.00 |
| 2 | INF | 0.5400 | 1.51825 | 1.52977 | 64.14 |
| 3 | −1.3539 | 5.1423 | 1.83945 | 1.86893 | 42.73 |
| 4 | −3.9835 | 0.1500 | | | |
| 5 | −31.7782 | 1.7004 | 1.57098 | 1.58258 | 71.30 |
| 6 | −13.4193 | 0.1500 | | | |

-continued

Objective 5

| s | r | d | ne | nh | vd |
|---|---|---|---|---|---|
| 7 | 21.4823 | 3.5431 | 1.57098 | 1.58258 | 71.30 |
| 8 | −25.8520 | 0.1500 | | | |
| 9 | 47.7023 | 4.6001 | 1.43986 | 1.44647 | 94.66 |
| 10 | −11.1433 | 0.5000 | 1.64132 | 1.66385 | 42.41 |
| 11 | 15.7885 | 5.7586 | 1.43986 | 1.44647 | 94.66 |
| 12 | −11.9231 | 0.1500 | | | |
| 13 | 43.1492 | 0.5000 | 1.64132 | 1.66385 | 42.41 |
| 14 | 9.7119 | 7.0790 | 1.43986 | 1.44647 | 94.66 |
| 15 | −7.6348 | 0.5000 | 1.61664 | 1.63723 | 44.49 |
| 16 | −75.6786 | 0.1500 | | | |
| 17 | 11.4470 | 2.6476 | 1.57098 | 1.58258 | 71.30 |
| 18 | −477.4290 | 0.1500 | | | |
| 19 | 6.3270 | 3.3233 | 1.57098 | 1.58258 | 71.30 |
| 20 | 27.2052 | 3.0573 | 1.83945 | 1.86893 | 42.73 |
| 21 | 3.2192 | 2.7299 | | | |
| 22 | −4.2921 | 0.6719 | 1.77621 | 1.79917 | 49.60 |
| 23 | 19.7083 | 2.0575 | | | |
| 24 | −88.9884 | 4.0191 | 1.74340 | 1.77943 | 32.26 |
| 25 | −7.7389 | | | | |

As indicated in the following, the objective 5 satisfies conditional expressions (1)-(11).

$f1/fob=2.94$ (1)

$n12=1.839$ (2)

$d12/L_{total}=0.104$ (3)

$NA_{ob}/|\beta|=0.0236$ (4)

$n13=1.571$ (5)

$|R1|/|R2|=0.831$ (6)

$P_{ob}=-0.031/mm$ (7)

$NA_{ob}=1.4155$ (8)

$\Delta_{z1}/DOF_e=-0.08$ (9)

$Y_{reso}\times|\beta|=9.94\ mm$ (10)

$L_{total}=49.620\ mm$ (11)

FIGS. 11A-11D are each an aberration diagram for the objective 5 depicted in FIG. 10 and indicate aberrations that occur on an object surface when a pencil of infinitely distant light is incident from an image side. FIG. 11A is a spherical aberration diagram. FIG. 11B illustrates a sine-condition violation amount. FIG. 11C is an astigmatism diagram. FIG. 11D is a coma aberration diagram for a position with an object height ratio of 0.6 (object height 0.13 mm).

What is claimed is:

1. An immersion microscope objective comprising:
a first lens group that includes a meniscus lens component that is closest to an image among components of the first lens group, the meniscus lens component having a convex surface facing an object; and
a second lens group that is closer to the image than the first lens group is and includes at least one lens component,
wherein:
the first lens group includes a first cemented lens that is closest to the object among the components of the first lens group,
the first cemented lens consists of a planoconvex lens that includes a plane surface facing the object and a meniscus lens that has a negative refractive power and includes a concave surface facing the object, wherein the object, the planoconvex lens, and the meniscus lens are arranged in this order, and
the immersion microscope objective satisfies the following conditional expressions:

$2.4 \leq f1/fob$ (1)

$1.8 \leq n12 \leq 1.85$ (2)

$1.4 \leq NA_{ob}$ (8)

$-2 \leq \Delta_{z1}/DOF_e \leq 2$ (9)

where f1 indicates a focal length that the first cemented lens has for an e line, fob indicates a focal length that the immersion microscope objective has for the e line, n12 indicates a refractive index that the meniscus lens has for the e line, $NA_{ob}$ indicates a numerical aperture on an object side of the immersion microscope objective, $\Delta z_1$ indicates a difference between a position on an optical axis at which an RMS wave aberration in an h line is minimized and a position on the optical axis at which an RMS wave aberration in the e line is minimized, and $DOF_e$ indicates a depth of focus for the e line.

2. The immersion microscope objective of claim 1, satisfying the following conditional expression:

$0.095 \leq d12/L_{total}$ (3)

where d12 indicates a thickness that the meniscus lens has on the optical axis, and $L_{total}$ indicates a distance on the optical axis from an object surface to a lens surface that is closest to the image among lens surfaces of the immersion microscope objective.

3. The immersion microscope objective of claim 2, wherein:
the first lens group further includes a biconvex lens,
the biconvex lens is included in a lens component that is closest, second closest, or third closest to the object among components of the immersion microscope objective, and
the immersion microscope objective satisfies the following conditional expression:

$0.014 \leq NA_{ob}|\beta| \leq 0.034$ (4)

where β indicates a magnification of the immersion microscope objective.

4. The immersion microscope objective of claim 3, satisfying the following conditional expression:

$1.4 \leq n13 \leq 1.85$ (5)

where n13 indicates a refractive index that the biconvex lens has for the e line.

5. The immersion microscope objective of claim 4, satisfying the following conditional expression:

$0 \leq |R1|/|R2| \leq 1$ (6)

where R1 indicates a radius of curvature of a lens surface on an object side of the biconvex lens, and R2 indicates a radius of curvature of a lens surface on an image side of the biconvex lens.

6. The immersion microscope objective of claim 4, satisfying the following conditional expressions:

$0.014 \leq NA_{ob}|\beta| \leq 0.034$ (4)

$P_{ob} \leq 0$ (7)

where β indicates a magnification of the immersion microscope objective, and $P_{ob}$ indicates a Petzval sum of the immersion microscope objective for the e line.

7. The immersion microscope objective of claim 3, satisfying the following conditional expression:

$$0 \leq |R1|/|R2| \leq 1 \quad (6)$$

where R1 indicates a radius of curvature of a lens surface on an object side of the biconvex lens, and R2 indicates a radius of curvature of a lens surface on an image side of the biconvex lens.

8. The immersion microscope objective of claim 3, satisfying the following conditional expressions:

$$0.014 \leq NA_{ob}|\beta| \leq 0.034 \quad (4)$$

$$P_{ob} \leq 0 \quad (7)$$

where β indicates a magnification of the immersion microscope objective, and $P_{ob}$ indicates a Petzval sum of the immersion microscope objective for the e line.

9. The immersion microscope objective of claim 2, satisfying the following conditional expressions:

$$0.014 \leq NA_{ob}|\beta| \leq 0.034 \quad (4)$$

$$P_{ob} \leq 0 \quad (7)$$

where β indicates a magnification of the immersion microscope objective, and $P_{ob}$ indicates a Petzval sum of the immersion microscope objective for the e line.

10. The immersion microscope objective of claim 1, wherein:
the first lens group further includes a biconvex lens,
the biconvex lens is included in a lens component that is closest, second closest, or third closest to the object among components of the immersion microscope objective, and
the immersion microscope objective satisfies the following conditional expression:

$$0.014 \leq NA_{ob}|\beta| \leq 0.034 \quad (4)$$

where β indicates a magnification of the immersion microscope objective.

11. The immersion microscope objective of claim 10, satisfying the following conditional expression:

$$1.4 \leq n13 \leq 1.85 \quad (5)$$

where n13 indicates a refractive index that the biconvex lens has for the e line.

12. The immersion microscope objective of claim 11, satisfying the following conditional expression:

$$0 \leq |R1|/|R2| \leq 1 \quad (6)$$

where R1 indicates a radius of curvature of a lens surface on an object side of the biconvex lens, and R2 indicates a radius of curvature of a lens surface on an image side of the biconvex lens.

13. The immersion microscope objective of claim 11, satisfying the following conditional expressions:

$$0.014 \leq NA_{ob}|\beta| \leq 0.034 \quad (4)$$

$$P_{ob} \leq 0 \quad (7)$$

where β indicates a magnification of the immersion microscope objective, and $P_{ob}$ indicates a Petzval sum of the immersion microscope objective for the e line.

14. The immersion microscope objective of claim 10, satisfying the following conditional expression:

$$0 \leq |R1|/|R2| \leq 1 \quad (6)$$

where R1 indicates a radius of curvature of a lens surface on an object side of the biconvex lens, and R2 indicates a radius of curvature of a lens surface on an image side of the biconvex lens.

15. The immersion microscope objective of claim 14, satisfying the following conditional expressions:

$$0.014 \leq NA_{ob}|\beta| \leq 0.034 \quad (4)$$

$$P_{ob} \leq 0 \quad (7)$$

where β indicates a magnification of the immersion microscope objective, and $P_{ob}$ indicates a Petzval sum of the immersion microscope objective for the e line.

16. The immersion microscope objective of claim 10, satisfying the following conditional expressions:

$$0.014 \leq NA_{ob}|\beta| \leq 0.034 \quad (4)$$

$$P_{ob} \leq 0 \quad (7)$$

where β indicates a magnification of the immersion microscope objective, and $P_{ob}$ indicates a Petzval sum of the immersion microscope objective for the e line.

17. The immersion microscope objective of claim 1, satisfying the following conditional expressions:

$$0.014 \leq NA_{ob}|\beta| \leq 0.034 \quad (4)$$

$$P_{ob} \leq 0 \quad (7)$$

where β indicates a magnification of the immersion microscope objective, and $P_{ob}$ indicates a Petzval sum of the immersion microscope objective for the e line.

18. The immersion microscope objective of claim 1, satisfying the following conditional expression:

$$9 \text{ mm} \leq Y_{reso} \times |\beta| \leq 20 \text{ mm} \quad (10)$$

where $Y_{reso}$ indicates a maximum object height within a region on a plane orthogonal to the optical axis that crosses the position on the optical axis at which the RMS wave aberration in the e line is minimized, the region being such that the RMS wave aberration in the e line is $0.2\lambda_e$ or lower, $\lambda_e$ indicates a wavelength of the e line, and β indicates a magnification of the immersion microscope objective.

19. The immersion microscope objective of claim 1, satisfying the following conditional expression:

$$L_{total} \leq 100 \text{ mm} \quad (11)$$

where $L_{total}$ indicates a distance on the optical axis from an object surface to a lens surface that is closest to the image among lens surfaces of the immersion microscope objective.

20. An immersion microscope objective comprising:
a first lens group that includes a meniscus lens component that is closest to an image among components of the first lens group, the meniscus lens component having a convex surface facing an object; and
a second lens group that is closer to the image than the first lens group is and includes at least one lens component,
wherein:
the first lens group includes a first cemented lens that is closest to the object among the components of the first lens group,
the first cemented lens consists of a planoconvex lens that includes a plane surface facing the object and a meniscus lens that has a negative refractive power and includes a concave surface facing the object, wherein the object, the planoconvex lens, and the meniscus lens are arranged in this order, and the immersion microscope objective satisfies the following conditional expressions:

$$2.4 \leq f1/fob \quad (1)$$

$$1.8 \leq n12 \leq 1.85 \quad (2)$$

$$9 \text{ mm} \leq Y_{reso} \times |\beta| \leq 20 \text{ mm} \quad (10)$$

where f1 indicates a focal length that the first cemented lens has for an e line, fob indicates a focal length that the immersion microscope objective has for the e line, n12 indicates a refractive index that the meniscus lens has for the e line, $Y_{reso}$ indicates a maximum object height within a region on a plane orthogonal to an optical axis that crosses a position on the optical axis at which an RMS wave aberration in the e line is minimized, the region being such that the RMS wave aberration in the e line is $0.2\lambda_e$ or lower, $\lambda_e$ indicates a wavelength of the e line, and $\beta$ indicates a magnification of the immersion microscope objective.

21. The immersion microscope objective of claim 20, satisfying the following conditional expression:

$$0.095 \leq d12/L_{total} \quad (3)$$

where d12 indicates a thickness that the meniscus lens has on the optical axis, and $L_{total}$ indicates a distance on the optical axis from an object surface to a lens surface that is closest to the image among lens surfaces of the immersion microscope objective.

22. The immersion microscope objective of claim 21, wherein:

the first lens group further includes a biconvex lens, the biconvex lens is included in a lens component that is closest, second closest, or third closest to the object among components of the immersion microscope objective, and the immersion microscope objective satisfies the following conditional expression:

$$0.014 \leq NA_{ob}|\beta| \leq 0.034 \quad (4)$$

where $NA_{ob}$ indicates a numerical aperture on an object side of the immersion microscope objective.

23. The immersion microscope objective of claim 22, satisfying the following conditional expression:

$$1.4 \leq n13 \leq 1.85 \quad (5)$$

where n13 indicates a refractive index that the biconvex lens has for the e line.

24. The immersion microscope objective of claim 23, satisfying the following conditional expression:

$$0 \leq |R1|/|R2| \leq 1 \quad (6)$$

where R1 indicates a radius of curvature of a lens surface on an object side of the biconvex lens, and R2 indicates a radius of curvature of a lens surface on an image side of the biconvex lens.

25. The immersion microscope objective of claim 23, satisfying the following conditional expressions:

$$0.014 \leq NA_{ob}|\beta| \leq 0.034 \quad (4)$$

$$P_{ob} \leq 0 \quad (7)$$

where $NA_{ob}$ indicates a numerical aperture on an object side of the immersion microscope objective, and $P_{ob}$ indicates a Petzval sum of the immersion microscope objective for the e line.

26. The immersion microscope objective of claim 22, satisfying the following conditional expression:

$$0 \leq |R1|/|R2| \leq 1 \quad (6)$$

where R1 indicates a radius of curvature of a lens surface on an object side of the biconvex lens, and R2 indicates a radius of curvature of a lens surface on an image side of the biconvex lens.

27. The immersion microscope objective of claim 22, satisfying the following conditional expression:

$$0.014 \leq NA_{ob}|\beta| \leq 0.034 \quad (4)$$

$$P_{ob} \leq 0 \quad (7)$$

where $NA_{ob}$ indicates a numerical aperture on an object side of the immersion microscope objective, and $P_{ob}$ indicates a Petzval sum of the immersion microscope objective for the e line.

28. The immersion microscope objective of claim 21, satisfying the following conditional expressions:

$$0.014 \leq NA_{ob}|\beta| \leq 0.034 \quad (4)$$

$$P_{ob} \leq 0 \quad (7)$$

where $NA_{ob}$ indicates a numerical aperture on an object side of the immersion microscope objective, and $P_{ob}$ indicates a Petzval sum of the immersion microscope objective for the e line.

29. The immersion microscope objective of claim 20, wherein:

the first lens group further includes a biconvex lens, the biconvex lens is included in a lens component that is closest, second closest, or third closest to the object among components of the immersion microscope objective, and the immersion microscope objective satisfies the following conditional expression:

$$0.014 \leq NA_{ob}|\beta| \leq 0.034 \quad (4)$$

where $NA_{ob}$ indicates a numerical aperture on an object side of the immersion microscope objective.

30. The immersion microscope objective of claim 29, satisfying the following conditional expression:

$$1.4 \leq n13 \leq 1.85 \quad (5)$$

where n13 indicates a refractive index that the biconvex lens has for the e line.

31. The immersion microscope objective of claim 30, satisfying the following conditional expression:

$$0 \leq |R1|/|R2| \leq 1 \quad (6)$$

where R1 indicates a radius of curvature of a lens surface on an object side of the biconvex lens, and R2 indicates a radius of curvature of a lens surface on an image side of the biconvex lens.

32. The immersion microscope objective of claim 30, satisfying the following conditional expressions:

$$0.014 \leq NA_{ob}|\beta| \leq 0.034 \quad (4)$$

$$P_{ob} \leq 0 \quad (7)$$

where $NA_{ob}$ indicates a numerical aperture on an object side of the immersion microscope objective, and $P_{ob}$ indicates a Petzval sum of the immersion microscope objective for the e line.

33. The immersion microscope objective of claim 29, satisfying the following conditional expression:

$$0 \leq |R1|/|R2| \leq 1 \quad (6)$$

where R1 indicates a radius of curvature of a lens surface on an object side of the biconvex lens, and R2 indicates a radius of curvature of a lens surface on an image side of the biconvex lens.

34. The immersion microscope objective of claim 33, satisfying the following conditional expressions:

$$0.014 \leq NA_{ob}|\beta| \leq 0.034 \quad (4)$$

$$P_{ob} \leq 0 \quad (7)$$

where $NA_{ob}$ indicates a numerical aperture on an object side of the immersion microscope objective, and $P_{ob}$ indicates a Petzval sum of the immersion microscope objective for the e line.

35. The immersion microscope objective of claim 29, satisfying the following conditional expression:

$$P_{ob} \leq 0 \quad (7)$$

where $P_{ob}$ indicates a Petzval sum of the immersion microscope objective for the e line.

36. The immersion microscope objective of claim 20, satisfying the following conditional expressions:

$$0.014 \leq NA_{ob}|\beta| \leq 0.034 \quad (4)$$

$$P_{ob} \leq 0 \quad (7)$$

where $NA_{ob}$ indicates a numerical aperture on an object side of the immersion microscope objective, and $P_{ob}$ indicates a Petzval sum of the immersion microscope objective for the e line.

37. The immersion microscope objective of claim 20, satisfying the following conditional expression:

$$L_{total} \leq 100 \text{ mm} \quad (11)$$

where $L_{total}$ indicates a distance on the optical axis from an object surface to a lens surface that is closest to the image among lens surfaces of the immersion microscope objective.

* * * * *